United States Patent
Gschwind et al.

(10) Patent No.: US 6,513,109 B1
(45) Date of Patent: Jan. 28, 2003

(54) METHOD AND APPARATUS FOR IMPLEMENTING EXECUTION PREDICATES IN A COMPUTER PROCESSING SYSTEM

(75) Inventors: Michael K. Gschwind, Danbury, CT (US); Sumedh Sathaye, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,220

(22) Filed: Aug. 31, 1999

(51) Int. Cl.$^7$ ................................................ G06F 9/00
(52) U.S. Cl. ........................................ 712/200; 712/233
(58) Field of Search ................................ 712/200, 220, 712/233, 23

(56) References Cited

U.S. PATENT DOCUMENTS

| | | | |
|---|---|---|---|
| 5,632,023 A | * 5/1997 | White et al. | 712/215 |
| 5,758,051 A | * 5/1998 | Moreno et al. | 714/2 |
| 5,799,179 A | 8/1998 | Ebcioglu et al. | 712/234 |
| 5,901,308 A | * 5/1999 | Cohn et al. | 712/216 |
| 5,999,738 A | * 12/1999 | Schlansker et al. | 712/234 |
| 6,260,189 B1 | * 7/2001 | Batten et al. | 717/151 |
| 6,442,679 B1 | * 8/2002 | Klauser et al. | 712/218 |

OTHER PUBLICATIONS

Mahlke et al., "Sentinel Scheduling for VLIW and Superscalar Processors", Proceedings of the 5$^{th}$ International Conference on Architectural Support for Programming Languages and Operating Systems, Oct. 1992.

Park et al., "On Predicated Execution", Tech. Rep. HPL–91–58, HP Laboratories, Palo Alto, CA, May 1991.

Rau, et al., "The Cydra 5 Departmental Supercomputer Design Philosophies, Decisions, and Trade–offs", IEEE Computer Society, vol. 22, No. 1, Jan. 1989.

David C. Lin, "Compiler Support For Predicated Execution In Superscalar Processors", Thesis, Master of Science in Electrical Engineering, Graduate College, University of Illinois, 1990.

Mahlke et al., "Effective Compiler Support for Predicated Execution Using the Hyperblock", IEEE, Sep. 1992, pp. 45–54.

(List continued on next page.)

*Primary Examiner*—Eric Coleman
(74) *Attorney, Agent, or Firm*—F. Chau & Associates, LLP

(57) ABSTRACT

There is provided a method for executing an ordered sequence of instructions in a computer processing system. The sequence of instructions is stored in a memory of the system. At least one of the instructions includes a predicated instruction that represents at least one operation that is to be conditionally performed based upon an associated flag value. The method includes the step of fetching a group of instructions from the memory. Execution of instructions are scheduled within the group, wherein the predicated instruction is moved from its original position in the ordered sequence of instructions to an out-of-order position in the sequence of instructions. The instructions are executed in response to the scheduling. In one embodiment of the invention, the method further includes generating a predicted value for the associated flag value, when the associated flag value is not available at execution of the predicated instruction. In another embodiment, the method further includes modifying execution of the operations represented by the predicated instruction based upon the predicted value. In yet another embodiment, the modifying step includes selectively suppressing either the execution or write back of results generated by the operations represented by the predicated instruction based upon the predicted value. In still another embodiment, the method includes predicting a data dependence relationship of an instruction with a previous predicated instruction or another previous instruction. The correctness of the relationship prediction may be verified, and a selection may be made from among a number of predicted dependencies.

35 Claims, 11 Drawing Sheets

OTHER PUBLICATIONS

K. Ebcioglu, "Some Design Ideas for a VLIW Architecture for Sequential–Natured Software, Parallel Processing", Cosnard et al. (Editors), Proceedings of the IFIP WG 10.3 Working Conference on Parallel Processing, Pisa Italy, Apr. 25–27, 1988, pp. 3–21.

Ebcioglu et al., "Some Global Compiler Optimizations and Architectural Features for Improving Performance of Superscalars", Research Report, RC 16145 (#71759) Oct. 2, 1990, pp. 1–13.

Ebcioglu et al., "An Eight–Issue Tree–VLIW Processor for Dynamic Binary Translation" IEEE Feb. 1998, pp. 488–495.

Smith et al., "Implementing Precise Interrupts in Pipelined Processors", IEEE Transactions on Computers, vol. 37, No. 5, May 1988, pp. 562–573.

Pnevmatikatos et al., "Guarded Execution and Branch Prediction in Dynamic ILP Processors", 21st International Symposium on Computer Architecture, Chicago, IL, 1994.

* cited by examiner

METHOD AND APPARATUS FOR IMPLEMENTING EXECUTION PREDICATES IN A COMPUTER PROCESSING SYSTEM

BACKGROUND

1. Technical Field

The present invention relates generally to computer processing systems and, in particular, to a method and apparatus for implementing execution predicates in a computer processing system.

2. Background Description

Early microprocessors generally processed instructions one at a time. Each instruction was processed using four sequential stages: instruction fetch; instruction decode; instruction execute; and result writeback. Within such microprocessors, different dedicated logic blocks performed each different processing stage. Each logic block waited until all the preceding logic blocks completed operations before beginning its operation.

Improved computational speed has been obtained by increasing the speed with which the computer hardware operates and by introducing parallel processing in one form or another. One form of parallel processing relates to the recent introduction of microprocessors of the "superscalar" type, which can effect parallel instruction computation. Typically, superscalar microprocessors have multiple execution units (e.g., multiple integer arithmetic logic units (ALUs)) for executing instructions and, thus, have multiple "pipelines". As such, multiple machine instructions may be executed simultaneously in a superscalar microprocessor, providing obvious benefits in the overall performance of the device and its system application.

For the purposes of this discussion, latency is defined as the delay between the fetch stage of an instruction and the execution stage of the instruction. Consider an instruction which references data stored in a specified register. Such an instruction requires at least four machine cycles to complete. In the first cycle, the instruction is fetched from memory. In the second cycle, the instruction is decoded. In the third cycle, the instruction is executed and, in the fourth cycle, data is written back to the appropriate location.

To improve efficiency and reduce instruction latency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock pulse the result of each processing stage is passed to the subsequent processing stage. Microprocessors that use the technique of overlapping the fetch, decode, execute, and writeback stages are known as "pipelined" microprocessors. In principle, a pipelined microprocessor can complete the execution of one instruction per machine cycle when a known sequence of instructions is being executed. Thus, it is evident that the effects of the latency time are reduced in pipelined microprocessors by initiating the processing of a second instruction before the actual execution of the first instruction is completed.

In general, instruction flow in a microprocessor requires that the instructions are fetched and decoded from sequential locations in a memory. Unfortunately, computer programs also include branch instructions. A branch instruction is an instruction that causes a disruption in this flow, e.g., a taken branch causes decoding to be discontinued along the sequential path, and resumed at a new location in memory. Such an interruption in pipelined instruction flow results in a substantial degradation in pipeline performance.

Accordingly, many pipelined microprocessors use branch prediction mechanisms that predict the existence and the outcome of branch instructions (i.e., taken or not taken) within an instruction stream. The instruction fetch unit uses the branch predictions to fetch subsequent instructions.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier, if the resources required by the later appearing operations are free. Thus, out-of-order execution reduces the overall execution time of a program by exploiting the availability of the multiple functional units and using resources that would otherwise be idle. Reordering the execution of operations requires reordering the results produced by those operations, so that the functional behavior of the program is the same as what would be obtained if the instructions were executed in their original sequential order.

In general, there are two basic approaches to scheduling the execution of instructions: dynamic scheduling and static scheduling. In dynamic scheduling, the instructions are analyzed at execution time and the instructions are scheduled in hardware. In static scheduling, a compiler/programmer analyzes and schedules the instructions when the program is generated. Thus, static scheduling is accomplished through software. These two approaches can be jointly implemented.

Effective execution in pipelined architectures requires that the pipeline have a high utilization rate, i.e., that each unit in a pipeline is steadily executing instructions. Some operations cause a disruption of this utilization, such as branch instructions or unpredictable dynamic events such as cache misses.

A number of techniques have been developed to solve these issues. For example, branch prediction is utilized to eliminate or reduce the branch penalty for correctly predicted branches. Moreover, dynamic scheduling of instructions in out-of-order superscalar processors is utilized to maintain a high utilization rate even when events occur dynamically.

However, branch prediction does not fully eliminate the cost of branching, since even correctly predicted branches cause disruption for fetching new instructions. Furthermore, branches reduce the compiler's ability to schedule instructions statically. This degrades the performance of program execution, especially for implementations which execute instructions in-order, such as very long instruction word architectures (VLIW).

To address these problems, a technique referred to as predication has been introduced to eliminate branches for some code sequences. This technique replaces control flow instructions by conditionally executed instructions (called "predicated instructions"), which are executed if a particular condition (the "predicate") is either TRUE or FALSE. For an article describing predicated execution, see "On Predicated Execution", Park and Schlansker, Technical Report No. HPL-91-58, Hewlett-Packard, Palo Alto, Calif., May 1991.

Predication has been discussed as a strategy which reduces control dependencies into data dependencies. This is achieved by converting conditional branches into guards for each instruction on a conditional path. This process is called "if-conversion". Predicated architectures offer benefits because they reduce the number of branches which must be executed. This is especially important in statically scheduled architectures where if-conversion allows for the execution of instructions on both paths of a branch and eliminates the branch penalty.

Consider the following example code sequence:

```
if (a < 0)
    a--;
else
    a++;
```

Further, consider a translation of this code for a microprocessor without a predication facility, and with the variable "a" assigned to a general purpose register r3. For an architecture such as the IBM PowerPC™ architecture, this translates into an instruction sequence with two branches:

```
    cmpwicr0, r3, 0      ; compare a < 0
    bc    false, cr0.1t, L1   ; branch if a >= 0
    addicr3, r3, -1      ; a--
    b     L2             ; skip else path
L1: addicr3, r3, 1       ; a ++
L2: ...
```

On a microprocessor similar to the IBM PowerPC™ but with a predication facility, this translated code sequence can be converted to a branch-free sequence. In the following example, predicated instructions are indicated by an if clause which specifies the predicate immediately following the instruction

```
cmpwicr0, r3, 0         ; compare a < 0
addicr3, r3, -1 if cr0.1t; a-- if a < 0
addicr3, r3, 1 if !cr0.1t; a++ if a >= 0
...
```

Using predication, some branches can be eliminated, thereby improving the ability of the compiler to schedule instructions and eliminating the potential for costly mispredicted branches. However, conventional prediction architectures have not been adequately addressed intergenerational compatibility and appropriate dynamic adaptation to dynamic events and variable latency operations (such as memory accesses). Specifically, implementations of predicated architectures have relied on static scheduling and fixed execution order, reducing the ability to respond to dynamic events. Also, because each predicate forms an additional input operand, predicated instructions have to wait until the predicate has been evaluated, whereas in a branch-prediction based scheme, execution can continue based on the prediction of the condition.

As a result, current predication schemes do not adequately address the requirements of instruction set architectures with variable implementation targets, where implementations can execute instructions in-order or out-of-order. Further, current predication schemes do not adequately support implementations with varying performance levels.

A summary of related art dealing with predication will now be given. FIG. 1 is a diagram illustrating a predicate prediction architecture with predicated execution and execution suppression according to the prior art. In particular, the architecture of FIG. 1 corresponds to an implementation of predication for the Cydra 5 supercomputer which is described in the article "The Cydra 5 departmental supercomputer", Rau et al., IEEE Computer, Vol. 22, No. 1, p. 12–35, January 1989. In the Cydra 5 supercomputer, the predicate values are fetched during the operand fetch, similar to all other operands. If the predicate operand is FALSE, then the execution of the predicated operation is suppressed. This design offers conceptual simplicity and the ability to combine execution paths for improved scheduling of statically scheduled architectures. However, predicates need to be available early in the execution phase.

An alternative predicate prediction architecture is illustrated in FIG. 2, which is a diagram of a predicate prediction architecture with predicated execution and writeback suppression according to the prior art. The architecture of FIG. 2 is described in "Compiler Support for Predicated Execution in SuperScalar Processors", D. Lin, MS thesis, University of Illinois, September 1990, and "Effective Compiler Support for Predicated Execution Using the Hyperblock", Mahlke et al., Proc. of the 25th International Symposium on Microarchitecture, pp. 45–54, December 1992. In this architecture, which is based upon the Cydra 5 work, all operations are always executed but only those whose predicates evaluate to TRUE are written to the machine state. This scheme is referred to as writeback suppression. In the writeback suppression scheme, predicate registers can be evaluated later in the pipeline. With appropriate forwarding mechanisms, this allows for a reduction of the dependence distance to 0, i.e., a predicate can be evaluated and used in the same long instruction word architecture.

Predication can be combined with a compiler-based scheme for statically speculating operations to overcome the limitations of the Cydra 5 architecture described above. This approach is based on statically identifying instructions as being speculative through the use of an additional opcode bit. Such an approach is described by K. Ebcioglu, in "Some Design Ideas for a VLIW architecture for Sequential-Natured Software", Parallel Processing, Proceedings of IFIP WG 10.3 Working Conference on Parallel Processing, North Holland, Cosnard et al., eds., pp. 3–21 (1988).

Further extensions to this idea are described by: K. Ebcioglu and R. Groves, in "Some Global Compiler Optimizations and Architectural Features for Improving Performance of Superscalars", Research Report No. RC16145, IBM T. J. Watson Research Center, Yorktown Heights, N.Y., October 1990; and U.S. Pat. No. 5,799,179, entitled "Handling of Exceptions in Speculative Instructions", issued on Aug. 25, 1998, assigned to the assignee herein, and incorporated herein by reference. An architecture implementing this approach is described by K. Ebcioglu, J. Fritts, S. Kosonocky, M. Gschwind, E. Altman, K. Kailas, T. Bright, in "An Eight-Issue Tree-VLIW Processor for Dynamic Binary Translation", International Conference on Computer Design, Austin, Tex., October 1998. A related approach is also outlined by Mahlke et al., in "Sentinel Scheduling for VLIW and Superscalar Processors", Fifth International Symposium on Architectural Support for Programming Languages and Operating Systems, Boston, Mass., October 1992.

However, static speculation requires the compiler to be aware of instruction latencies to schedule operations appropriately. This is generally not feasible due to two factors which have contributed to the industry's laggard acceptance of statically scheduled architectures. First, many events are dynamic and, thus, are not statically predictable (e.g., the latency of memory access operations due to the occurrence of cache misses). In addition, industry architectures are expected to be viable for several years (typically a decade or longer) with multiple implementations of varying internal structure and design and with highly differentiated performance levels.

Accordingly, it would be desirable and highly advantageous to have a method and system for incorporating predicated execution in dynamically scheduled out-of-order superscalar instruction processors. Preferably, such a method and system would also support static scheduling for in-order execution.

SUMMARY OF THE INVENTION

The present invention is directed to a method and apparatus for implementing execution predicates in a computer processing system. The present invention combines the advantages of predicated execution with the ability to respond to dynamic events given by superscalar processor implementations. The present invention supports static scheduling for in-order execution, while allowing out-of-order executions to more aggressively execute code based on predicted conditions.

According to a first aspect of the invention, there is provided a method for executing an ordered sequence of instructions in a computer processing system. The sequence of instructions is stored in a memory of the system. At least one of the instructions includes a predicated instruction that represents at least one operation that is to be conditionally performed based upon an associated flag value. The method includes the step of fetching a group of instructions from the memory. Execution of instructions are scheduled within the group, wherein the predicated instruction is moved from its original position in the ordered sequence of instructions to an out-of-order position in the sequence of instructions. The instructions are executed in response to the scheduling.

According to a second aspect of the invention, the method further includes the step of writing results of the executing step to architected registers or the memory in an order corresponding to the ordered sequence of instructions.

According to a third aspect of the invention, the method further includes the step of generating a predicted value for the associated flag value, when the associated flag value is not available at execution of the predicated instruction.

According to a fourth aspect of the invention, the method further includes the step of modifying execution of the operations represented by the predicated instruction based upon the predicted value.

According to a fifth aspect of the invention, the modifying step includes the step of selectively suppressing write back of results generated by the operations represented by the predicated instruction based upon the predicted value.

According to a sixth aspect of the invention, the modifying step includes the step of selectively issuing operations represented by the predicated instruction based upon the predicted value.

According to a seventh aspect of the invention, the method further comprises the step of determining whether the predicted value for the associated flag value is correct, upon execution or retirement of the predicated instruction. The predicate instruction is executed using a correct prediction, when the predicted value for the associated flag value is not correct. Results corresponding to the execution of the predicated instruction are written to architected registers or the memory, when the predicted value for the associated flag value is correct.

According to an eight aspect of the invention, there is provided a method for executing instructions in a computer processing system. The instructions are stored in a memory of the system. At least one of the instructions includes a predicated instruction that represents at least one operation that is to be conditionally performed based upon at least one associated flag value. The method includes the steps of fetching a group of the instructions from the memory. In the event that the group includes a particular predicated instruction whose associated flag value is not available, data is generated which represents a predicted value for the associated flag value. Execution of operations represented by the particular predicated instruction are modified based upon the predicted value.

According to a ninth aspect of the invention, there is provided a method for executing instructions in a computer processing system. The instructions are stored in a memory of the system. The method includes the step of fetching a group of the instructions from the memory, wherein the group includes at least one predicated instruction that represents at least one operation that is to be conditionally performed based upon at least one associated flag value. The group of instructions including the predicated instruction are executed, even if the associated flag value of the predicated instruction is unavailable. A list is stored of one of register names and values for results of unresolved predicates. Instructions that use registers for which one of multiple names and multiple values are available are identified. For a given identified instruction, only one of either the multiple names or the multiple values is selected. Upon resolution of the predicate corresponding the given identified instruction, it is determined whether the selection is correct. Execution of operations subsequent to the given instruction are modified, when the selection is not correct.

According to a tenth aspect of the invention, there is provided a method for verifying predictions of future register names from architected source register names for an instruction to be retired. The method includes the step of determining whether each given source operand in the instruction corresponds to a plurality of future register names. It is determined whether the actual name for each of the source operands corresponds to the predicted name for each of the source operands, when the actual name to be used for each of the given source operands is not available. A misprediction repair is performed for the instruction, when at least one source operand name has been mispredicted. The instruction is retired, when the actual name for each of the source operands corresponds to the predicted name for each of the source operands.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
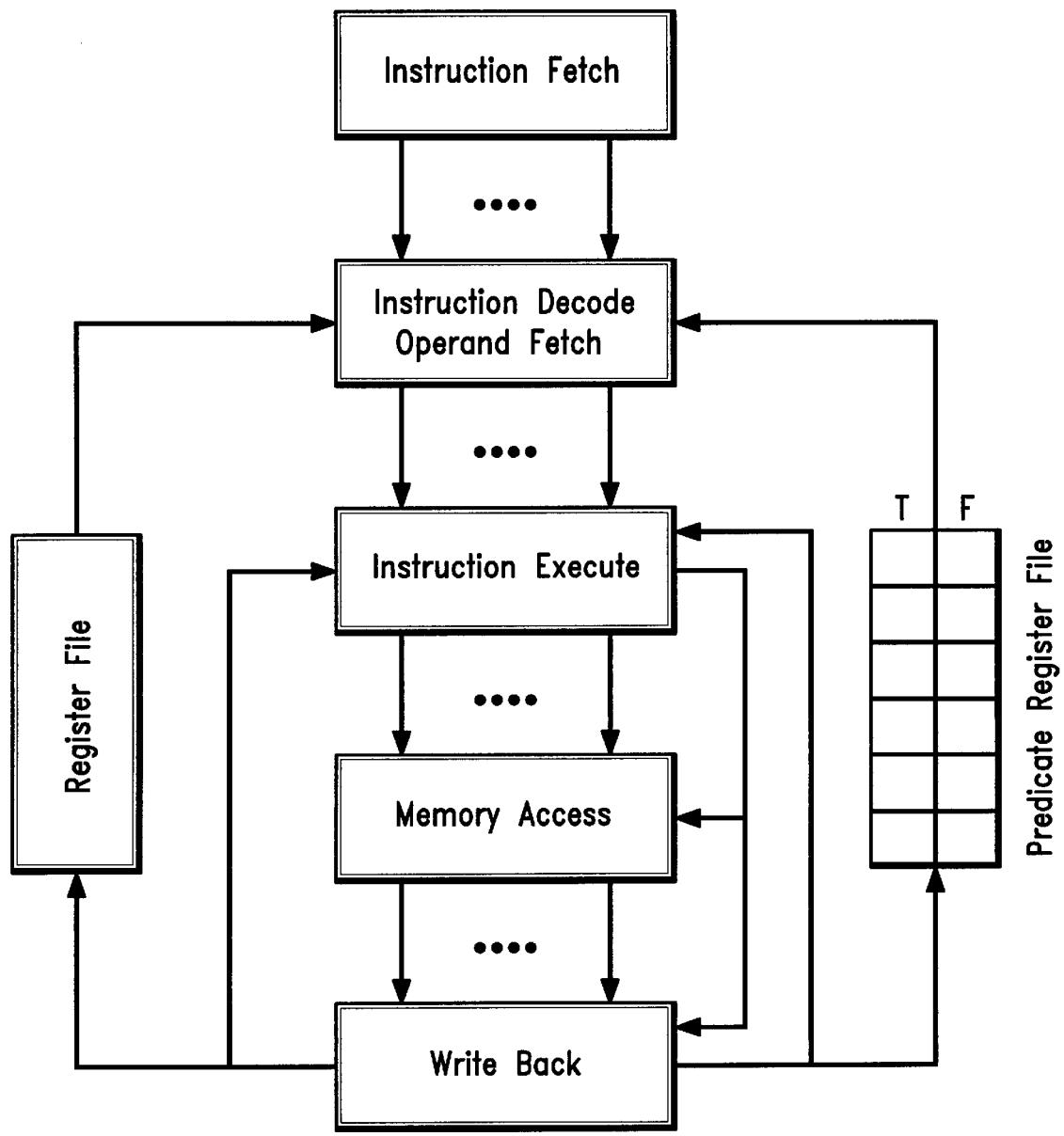
FIG. 1 is a diagram illustrating a predicate prediction architecture with predicated execution and execution suppression according to the prior art.
Figure 2:
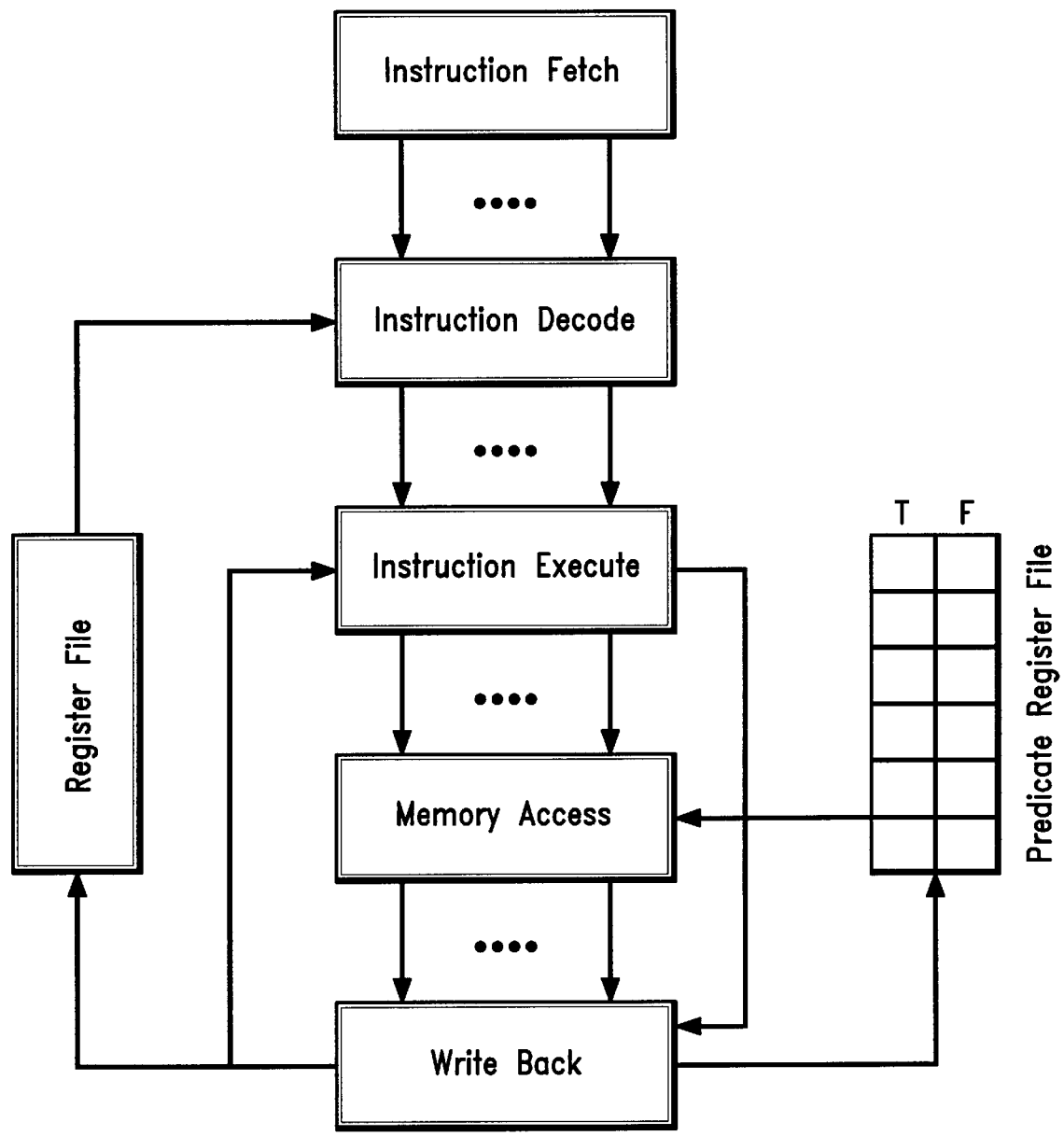
FIG. 2 is a diagram illustrating a predicate prediction architecture with predicated execution and writeback suppression according to the prior art.

The present invention is directed to a method and apparatus for implementing execution predicates in a computer processing system. The present invention may be used to perform predicate execution in computer processing systems employing dynamically scheduled out-of-order superscalar instruction processors. In such an implementation, the present invention allows out-of-order executions to more aggressively execute code based on the predicted conditions. Moreover, the present invention supports static scheduling for in-order execution.

To facilitate a clear understanding of the present invention, definitions of terms employed herein will now be given. Predication is a technique that has been introduced to eliminate branches for some code sequences. Predication replaces control flow instructions by conditionally executed instructions (called "predicated instructions"), which are executed if a particular condition (the "predicate") is either TRUE or FALSE. Out-of-order execution is a technique by which the operations in a sequential stream of instructions are reordered so that operations appearing later are executed earlier, if the resources required by the later appearing operations are free. A speculative operation is an out-of-order operation that may not necessarily be executed because, for example, the execution path in which it is located may not be followed but rather, another execution path may be followed instead.

Register file refers to a plurality of registers which are addressed by a register specifier. Multiple register files can be supported in an architecture, such as, for example, for storing different data types such as integer, floating point, condition code (predicate) data in different register files (e.g., the IBM POWERPC™ architecture) supports this organization). Alternatively, multiple data types can be stored in a single register file (e.g., the DEC VAX architecture supports this organization). Such a single register file is typically referred to as a general purpose register file. In some organizations, there may be register files for a few special data types, and a general purpose register file to store valuers of all remaining data types. According to one implementation technique of superscalar processors, data about register contents may be stored in multiple copies of a register file. An "architected register file" corresponds to the processor state at the in-order point of execution. results from the out-of-order or speculative execution of operations are written to a "future register file". If multiple register files exist (e.g., for integer, floating point and condition/predicate data), then architected and future register files may exist for each of these register files. This implementation technique is described by J. Smith and A. Plezkun, in "Implementing Precise Interrupts in Pipelined Processors, IEEE Transactions on Computers, Vol. 37, No. 5, pp. 562–73, May 1988.

Also to facilitate a clear understanding of the present invention, it is presumed that a single predicate is encoded in one fixed field in every instruction. However, it is to be appreciated that more than one predicate may be included in a single instruction. Alternatively, a single instruction may not include any predicates. In the case that multiple predicates are included in a single instruction, such multiple predicates may be combined using any type of logic function (e.g., and, or, exclusive OR, and so forth). It is to be further appreciated that the predicates can be in variable locations depending on the issued instruction, and that some instructions may include more predicates than other instructions.

It is to be appreciated that while register renaming is described in a cursory manner herein, register renaming may be readily implemented in conjunction with the present invention by one skilled in the art. In embodiments using execution suppression, the preferred implementation of register renaming does not allocate rename registers for destination registers of suppressed instructions. In embodiments using writeback suppression, each operation which has been allocated a new rename register for an architected register also maintains the name of the previous rename register allocated to such architecture. If the instruction will later be suppressed, then the previous rename register name is broadcast to all operations which contain a reference to the suppressed operation's physical (rename) register. On the other hand, if the instruction is not suppressed, then the actual operation result will be broadcast instead. A third embodiment uses a data dependence prediction mechanism to guide renaming as described further hereinbelow.

Branch prediction is another feature which, while not described in detail herein, may nonetheless be readily implemented in conjunction with the present invention by one skilled in the art. The tradeoffs in designing a processor supporting predicated execution and branch prediction are described in "Guarded Execution and Branch Prediction in Dynamic ILP Processors", 21st International Symposium on Computer Architecture, Chicago, Ill., 1994. Preferably, branch prediction is implemented in high performance embodiments of the present invention. In such embodiments, the same predictor may be used for both predicate and branch prediction. In an alternative embodiment, separate predictors may be used.

A conventional implementation of a processor capable of dynamically scheduling instructions (an out-of-order execution processor) includes the following features:

1. A first mechanism A for issuing instructions out-of-order, including the ability to detect dependencies among the instructions, rename the registers used by an instruction, and detect the availability of the resources required by an instruction.

2. A second mechanism B for maintaining the out-of-order state of the processor, which reflects the effects of instructions as they are executed (out-of-order).

3. A third mechanism C for retiring instructions in program order, and simultaneously updating the in-order state with the effects of an instruction being retired.

4. A fourth mechanism D for retiring an instruction in program order without updating the in-order state (effectively canceling the effects of the instruction being retired), and for resuming in-order execution of the program starting at the instruction being retired (which implies canceling all the effects present in the out-of-order state).

The third mechanism C is used to retire instructions when the effects of the instruction being retired are correct. On the other hand, the fourth mechanism D is used whenever there is some abnormal condition resulting from the execution of the instruction being retired or from some external event.

Figure 3:
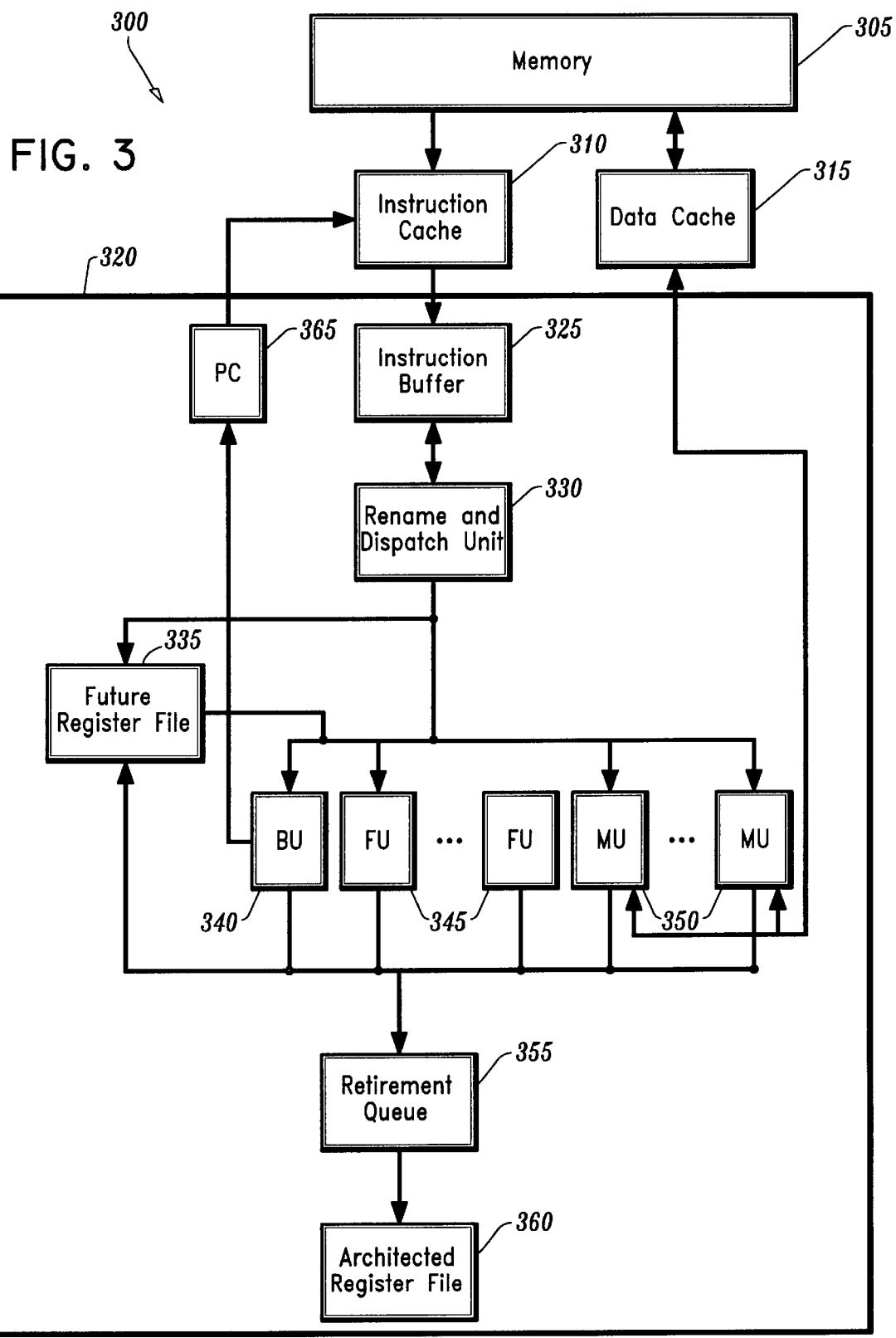
FIG. 3 is a diagram of a computer processing system that includes a superscalar processor and hardware resources for supporting reordering of instructions according to the present invention.

FIG. 3 is a diagram of a computer processing system 300 that includes a superscalar processor and hardware resources for supporting reordering of instructions according to the present invention. The mechanisms listed above (A through D) are incorporated into the system of FIG. 3.

The system 300 includes: a memory subsystem 305; an instruction cache 310; a data cache 315; and a processor unit 320. The processor unit 320 includes: an instruction buffer 325; an instruction rename and dispatch unit 330 (hereinafter "dispatch unit"); a future general purpose register file(s) 335 (hereinafter "future register file"); a branch unit (BU) 340; several functional units (FUs) 345 for performing integer, logic and floating-point operations; several memory units (MUs) 350 for performing load and store operations; a retirement queue 355; an architected in-order general purpose register file(s) 360 (hereinafter "architected register file"); and a program counter (PC) 365. It is to be appreciated that the instruction memory subsystem 305 includes main memory, and can optionally contain a caching hierarchy.

It is to be further appreciated that while the various embodiments of the present invention are described in terms of the processor architecture depicted in FIG. 3, those skilled in the art may readily adapt the present invention to other processor designs, such as variations of superscalar processor implementations or very long instruction word (VLIW) implementations.

The memory subsystem 305 stores the program instructions. The instruction cache 310 acts as a high-speed access buffer for the instructions. When instructions are not available in the instruction cache 310, the instruction cache 310 is filled using the contents of the memory subsystem 305. At each cycle, using the program counter 365, the instruction cache 310 is queried by instruction fetch logic (not shown) for the next set of instructions. The instruction fetch logic optionally includes branch prediction logic and branch prediction tables (not shown). In response to the query, the instruction cache 310 returns one or more instructions, which then enter the instruction buffer 325 in the same relative order. For each instruction in the instruction buffer 325, the Instruction Address (IA) is also held. The logic associated with the instruction buffer 325 allocates an entry in the retirement queue 355 (which is also referred to as a reorder buffer) for each of the instructions. The ordering of the entries in the retirement queue 355 is relatively the same as that of instruction fetch. The retirement queue 355 is described more fully hereinbelow.

The instruction buffer 325 copies the instructions to the dispatch unit 330, which performs the following multiple tasks:

1. The dispatch unit 330 decodes each instruction.
2. The dispatch unit 330 renames the destination operand specifier (s) in each instruction, in which the architected destination register operand specifiers are mapped to distinct physical register specifiers in the processor. The physical register specifiers specify the registers in the future register file 335 and architected register file 360. The dispatch unit 330 also updates relevant tables associated with the register rename logic (not shown).
3. The dispatch unit 330 queries the architected register file 360, and the future register file 335, in that order, for the availability of any source operands of the type general-register, floating-point register, condition register, or any other register type. If any of the operands are currently available in the architected register file 360, their values are copied along with the instruction. If the value of the operand is not currently available (because it is being computed by an earlier instruction), then the architected register file 360 stores an indication to that effect, upon which the future register file 335 is queried for this value using the physical register name (which is also available from the architected register file 360) where the value was to be available. If the value is found, then the value is copied along with the instruction. If the value is not found, then the physical register name where the value is to become available in the future is copied.
4. The dispatch unit 330 dispatches the instructions for execution to the following execution units: the branch unit 340; the functional units 345; and the memory units 350. The decision as to which instruction will enter a Reservation Station (not shown) (organized as a queue) for execution is made based on the execution resource requirements of the instruction and the availability of the execution units.

Once all the source operand values necessary for the execution of an instruction are available, the instruction executes in the execution units and the result value is computed. The computed values are written to the retirement queue 355 entry for the instruction (further described below), and any instructions waiting in the reservation stations for the values are marked as ready for execution.

As described above, the retirement queue 355 stores the instructions in-order. The retirement queue 355 also stores, for each instruction, its instruction address, the architected name(s) of its destination register(s), and the name(s) of the future register (s) onto which the architected destination register(s) was mapped. The retirement queue 355 also includes, for each instruction, space to store the value of the destination register (i.e., the result of the computation carried out on behalf of the instruction).

For branch instructions, the predicted outcome (both the branch direction and the target address) is also held in the retirement queue 355. That is, space is allocated in the retirement queue 355 to store the actual branch direction, and the actual target address to which the branch transferred control.

When an instruction completes execution and its results are available, the results are copied into this space in the corresponding entry of the retirement queue 355. For branch instructions, the actual outcomes are also copied. Some instructions may cause exceptions during their execution, due to abnormal conditions. The exceptions are noted, along with the data required to take appropriate action for the exceptional condition. As previously noted, an instruction which has caused an abnormal situation will be retired by the retirement logic using the fourth mechanism D. The instructions may complete execution out-of-order (that is, not necessarily in the same order as the program order), resulting in the entries in the retirement queue 35 being filled out-of-order.

The operation of the retirement logic (not shown), which operates using the information held in the retirement queue 355, will now be given. At each cycle, the retirement queue 355 is scanned to identify the entry at the head of the retirement queue 355 (the retirement queue 355 is essentially a FIFO ("first-in, first-out") queue). If the head instruction has completed execution, the instruction is retired using either the third mechanism C or the fourth mechanism D. In the case of the third mechanism C, any result values of the operations are retired to the architected register file 360, or any other portion of the architected in-order machine state. In the case of the fourth mechanism D, the effects of this instruction and all its successors are canceled, and execution is restarted in-order with the current instruction. Any results of instructions which store values in the data portion of the memory are written to the data cache 315. The data cache 315 acts as a high-speed access buffer for the program data held in the memory subsystem 305, and is filled from the memory subsystem 305 when the data is not available in the data cache 315. If the instruction to be retired from the processor 300 is a branch, then the actual direction of the branch is matched with the predicted direction and the actual target address is matched with the predicted target address. If there is a match in both cases, then branch retirement occurs without any extraordinary action. On the other hand, if there is a mismatch, then the mismatch results in a branch misprediction, which leads to a branch misprediction repair operation using the fourth mechanism D.

During a branch misprediction, all the instructions in the retirement queue 355 following the branch, which also are in the program memory at the (wrongly) predicted branch target address, are marked for squashing (the results of their computation are not retired to the processor architected state). Further, the states of the branch predictor and associated tables are updated to reflect the misprediction. The program counter 365 is given the new value of the instruction address to which the branch actually transferred control, and instruction fetch is re-initiated from that point on.

In addition to the components described above, superscalar processors (including those in accordance with the present invention) may optionally contain other components such as, for example, means for value prediction, means for memory instruction reordering, and means for canceling outstanding memory instructions when necessary. These are well-known elements of superscalar technology that are not essential to understanding the present invention and, thus, are not described in further detail herein.

Figure 4:
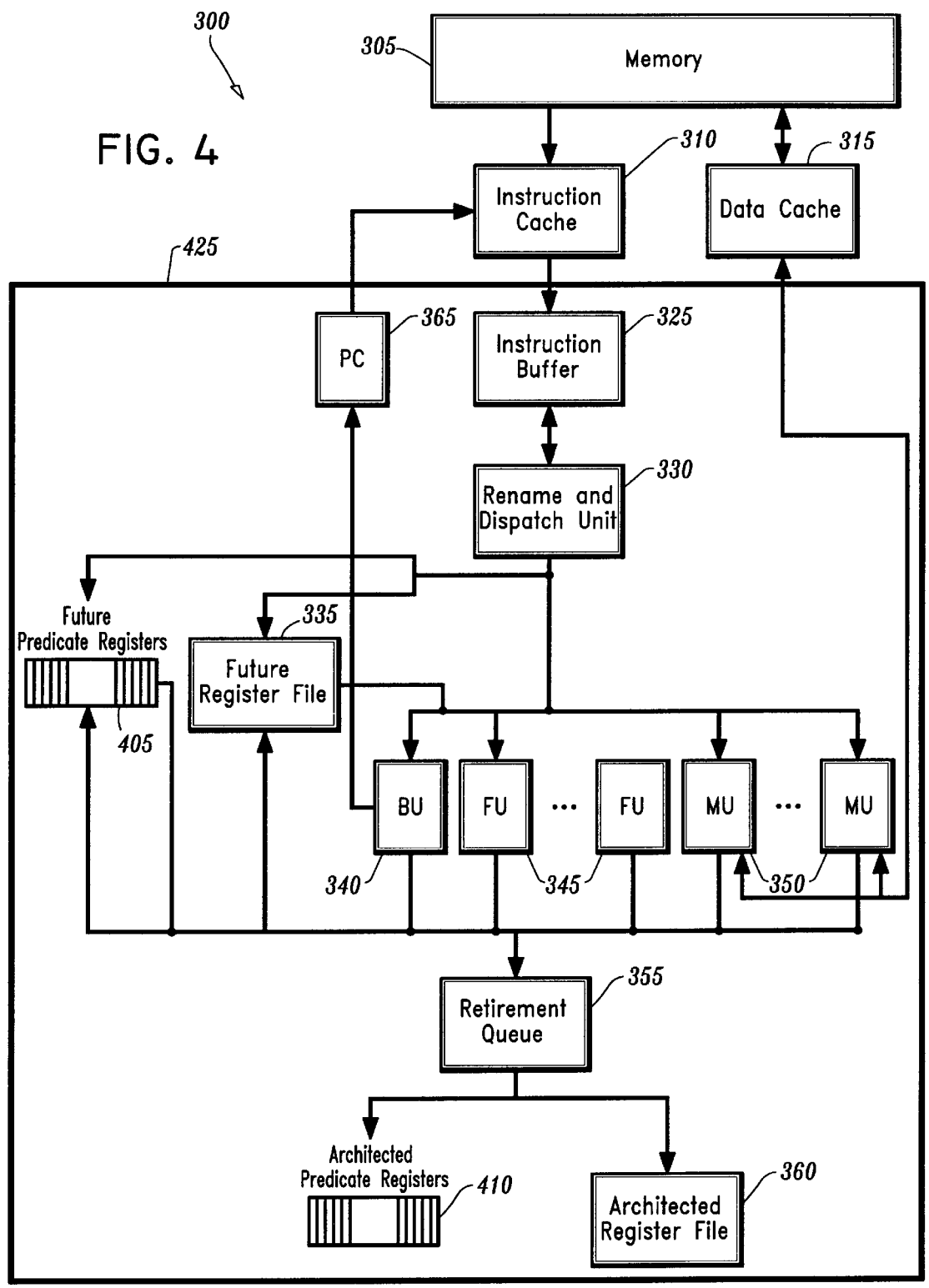
FIG. 4 is a diagram of a computer processing system that includes a superscalar processor and hardware resources for executing predicated instructions according to an embodiment of the present invention.

FIG. 4 is a diagram of a computer processing system 400 that includes a superscalar processor and hardware resources for executing predicated instructions according to an embodiment of the present invention. The system 400 includes: the memory subsystem 305; the instruction cache 310; the data cache 315; and a processor unit 425. The processor unit 425 includes: the instruction buffer 325; the dispatch unit 330; the future register file 335; the branch unit (BU) 340; several functional units (FUs) 345; several memory units (MUs) 350; the retirement queue 355; the architected register file 360; the program counter (PC) 365; a future predicate register file 405 and an architected in-order predicate register file 410 (hereinafter "architected predicate register file"), to support the execution of predicated instructions.

When an instruction is processed by the dispatch unit 330, references to predicate registers are resolved in a similar way as general purpose register references. Specifically, the dispatch unit 330 queries the architected predicated register file 405, and the future register file 335, in that order, for the availability of any source operands of the type predicate-register. If any such operands are currently available in the architected predicate register file 410, their values are copied along with the instruction. If the value of the operand is currently not available (because it is being computed by an earlier instruction), then the architected predicate register file 410 stores an indication to that effect, upon which the future predicate register file 405 is queried for this value using the physical register name (also available from the architected predicate register file 410) where the value was to be available. If the value is found, then the value is copied along with the instruction. If the value is not found, then the physical register name where the value is to become available in the future is copied.

Furthermore, retirement logic is extended to selectively suppress writeback of results based on the evaluation of the predicate condition. If the head instruction has completed execution, and the instruction is not predicated or the instruction is predicated and the predicate condition evaluates to TRUE, then the instruction is retired using either the third mechanism C or the fourth mechanism D. In the case of the third mechanism, any result values of the operations are retired to the architected register file 360 and the architected predicate register file 410, or any other portion of the architected in-order machine state. In the case of the fourth mechanism, the effects of the retired instruction and all its successors are canceled, and execution is restarted in-order with the current instruction. If the instruction at the head of the retirement queue 355 is predicated and the predicate condition evaluates to FALSE, then the results of this operation are suppressed, and retirement continues with the next instruction.

An optimized embodiment may suppress execution of operations dependent on the operation having the predicate therein if the predicate condition evaluates to FALSE. Yet another optimized embodiment may dispatch the operation before the predicate condition is evaluated (e.g., due to the unavailability of a source predicate register which serves as input for the evaluation of the predicate condition), and evaluate the predicate condition only at the time of retirement.

According to yet another embodiment of the present invention, a superscalar processor that supports the prediction of instruction execution predicates and that is implemented based on execution suppression is augmented with the following:

1. A first mechanism 1 for predicting a predicate.
2. A second mechanism 2 for accessing the predicate prediction.
3. A third mechanism 3 to suppress the execution of an instruction if its predicate is predicted to have the value FALSE, and bypass such instruction directly to the retirement queue 355.
4. A fourth mechanism 4 for checking the correctness of the prediction.
5. A fifth mechanism 5 for updating an incorrect prediction in the prediction table and restarting execution at the mispredicted instruction point.

The above described mechanisms (1 through 5) can be associated with different operations or phases in the processing of an operation while still maintaining the spirit and scope of the present invention. For example, the first mechanism 1 (for predicting the predicate) can be used when the instruction which computes a predicate is fetched, or when an instruction which uses this predicate is fetched. When the first mechanism 1 is triggered by an instruction which uses the predicate, the first mechanism 1 can be triggered while the instruction is being fetched (i.e., by the instruction address of the instruction), when the instruction has been decoded, or when the instruction is ready to be issued to a functional unit 345.

For illustrative purposes, it is presumed that (i) the mechanism for making a prediction is associated with the fetching of an instruction which may use such prediction (i.e., by its instruction address during the fetch), and (ii) that predictions are stored by a predicted predicate register file for future use by either this or other predicate-using operations. However, the mechanism for making a prediction may be associated with other stages of instruction processing, such as for example, instruction decode or instruction issue. Further, predictions may be stored in prediction tables or other means so that the predicted predicate register file can be omitted. One skilled in the art may readily modify the various embodiments of the present invention disclosed herein, while still maintaining the spirit and scope of the present invention.

The second mechanism 2 is employed after the instruction fetch, when the predicate register number becomes available. The predicted predicate register file 510 is then accessed in-order to determine the value of the predicted predicate register value.

The dispatch unit 330 either issues an instruction to a functional unit 345 or, suppresses the execution of the instruction and immediately passes the instruction to the retirement queue 355 (the latter occurring when the instruction is predicted to be not executed).

The mechanism to check prediction correctness is implemented in the retirement stage of the processor, and executed for predicated instructions when they are retired in-order. Comparison logic 520 checks for correctness of the predicate prediction by comparing the prediction against the in-order state of the architected predicate register file 410. When the prediction is incorrect, the predictor is updated during the retirement phase and the execution of the instruction is restarted with a correct prediction.

Based on this processing sequence, and on the mechanisms present in a processor supporting the prediction of execution predicates and the suppression of instruction execution, a processor processes each instruction as follows:

1. Fetch instruction, and simultaneously query the predictor with the value of the program counter 365.
2. Add predicted values to an overall predicted predicate state.
3. Look up any predicates used by the instruction.
4. Enter instruction in issue buffer 325.
5. Issue instruction.
6. If the instruction is predicted to be executed, then execute it; otherwise, bypass the execution of the instruction.
7. If the instruction was executed, then update the future register file 355.
8. Enter the instruction in the retirement queue 355 (regardless of whether the instruction was executed or not), with information about the predicate and its prediction.
9. When it is time to retire the instruction, check whether the prediction was correct.
10. If the prediction was incorrect, then perform misprediction repair by discarding speculative state information and restarting execution at the address corresponding to the program counter value. Predicate misprediction repair is performed similar to branch misprediction repair.
11. If the prediction was correct, then update the in-order state for the future register file 355 and the architected predicate register file 410.

Figure 5:
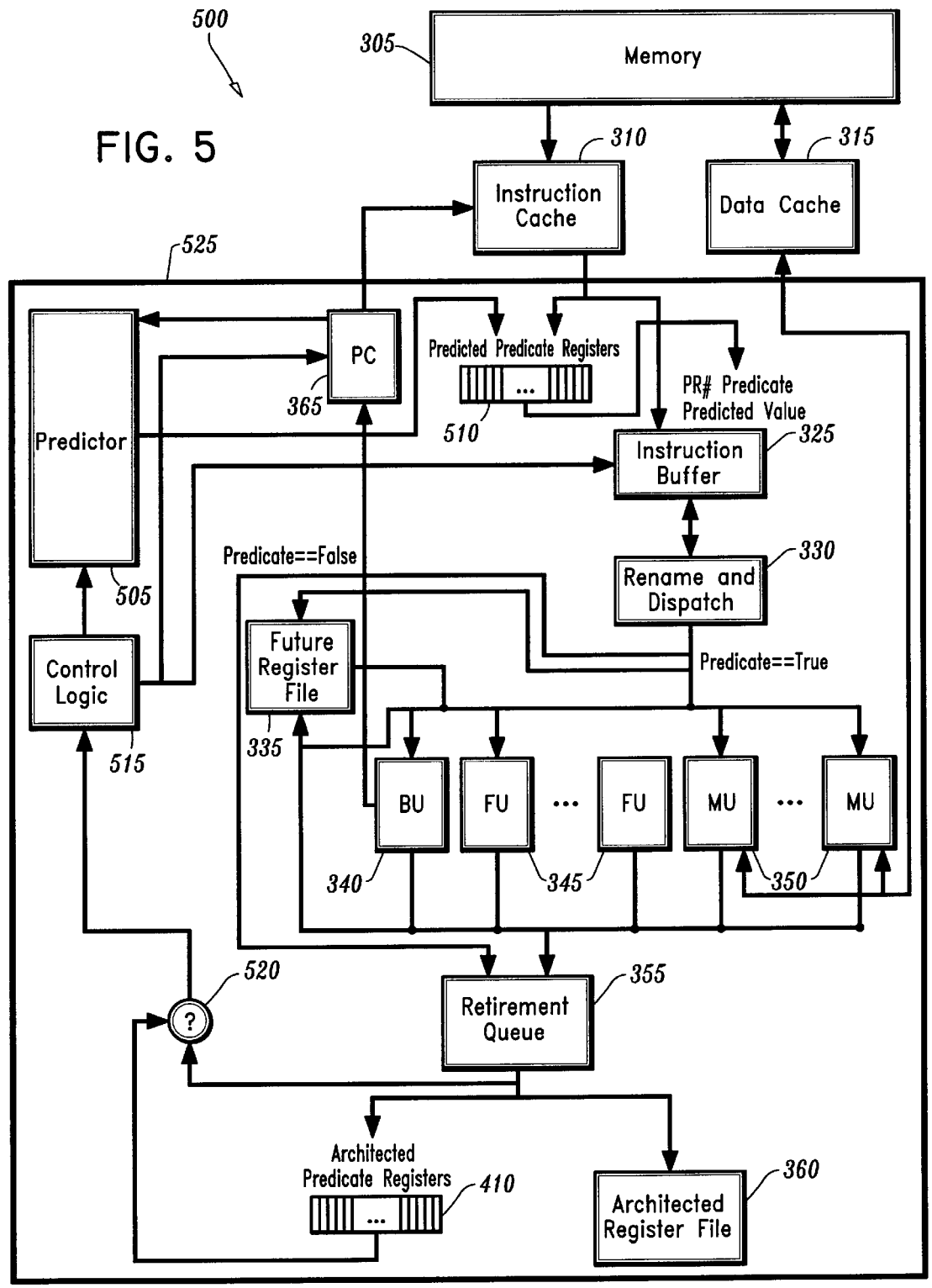
FIG. 5 is a diagram illustrating a system for performing out-of-order superscalar execution with predicate prediction according to an embodiment of the present invention.

FIG. 5 is a diagram illustrating a system 500 for performing out-of-order superscalar execution with predicate prediction according to the present invention. The system 500 includes: the memory subsystem 305; the instruction cache 310; the data cache 315; and a processor unit 525. The processor unit 525 includes: the instruction buffer 325; the dispatch unit 330; the future register file 335; the branch unit (BU) 340; several functional units (FUs) 345; several memory units (MUs) 350; the retirement queue 355; the architected register file 360; the program counter (PC) 365; the architected predicate register file 410; a predictor 505; a predicted predicate register file(s) 510; control logic 515; and prediction verification logic 520.

Figure 6:
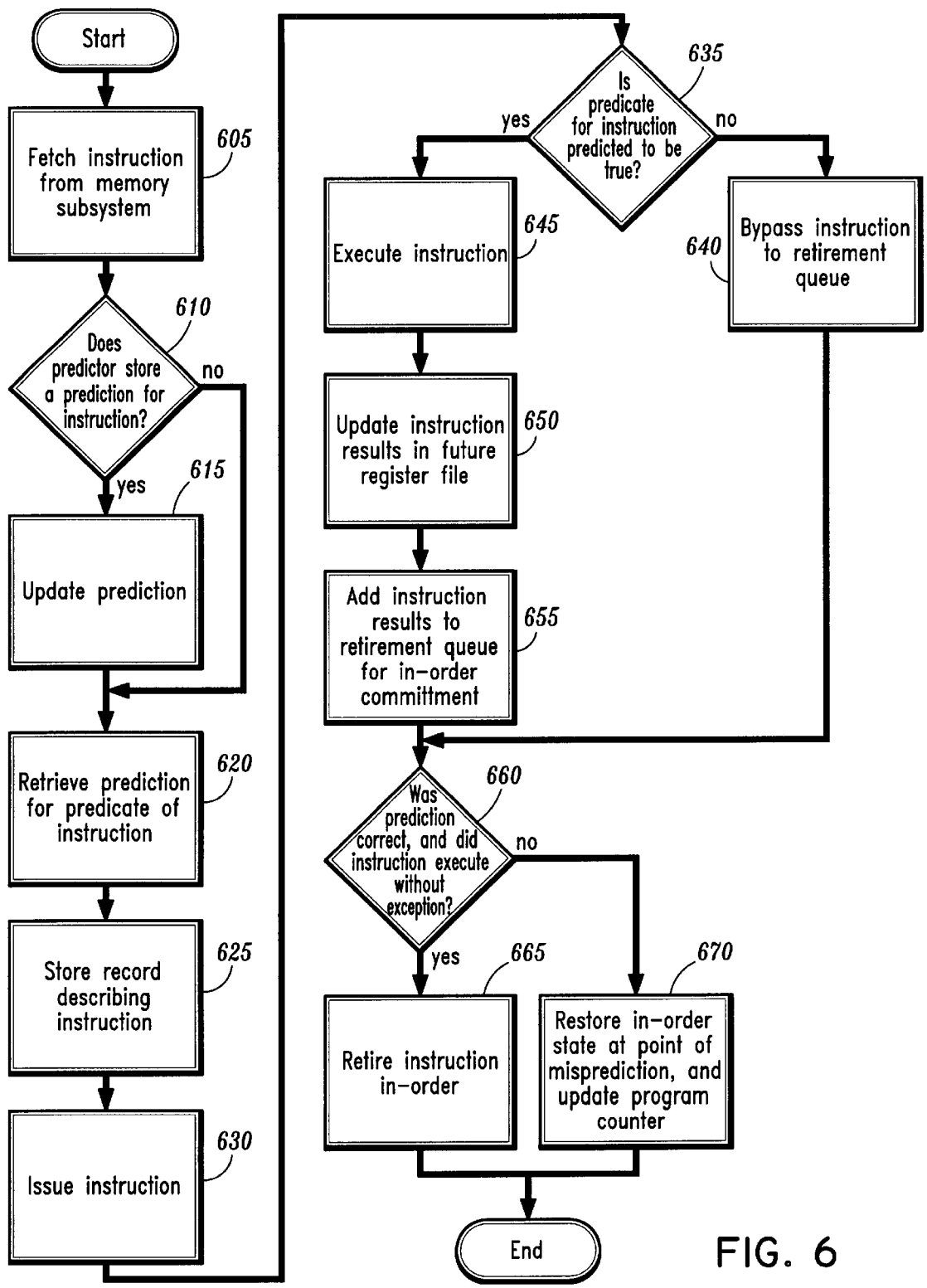
FIG. 6 is a flow chart illustrating a method for executing a predicated instruction using predicate predication according to an embodiment of the present invention.

FIG. 6 is a flow chart illustrating a method for executing a predicated instruction using predicate prediction according to an embodiment of the present invention. The method corresponds to an exemplary operation for a simple pipeline structure. However, it is to be appreciated that various other embodiments using other pipeline structures may be readily determined and implemented by one skilled in the art which maintain the spirit and scope of the present invention.

An instruction is fetched from the instruction cache 310 (or from instruction memory subsystem 305, in the case of a cache miss) (step 605), by accessing the instruction cache 310 with the value (address) of the program counter 365.

Preferably simultaneous with the performance of step 605, it is determined whether or not the predictor 505 stores a prediction for the instruction (step 610). The determination is made by providing the predictor 505 with the value (address) stored in the program counter 365 to determine if the value matches an instruction address stored therein. Upon a match, the prediction for that instruction is output from the predictor 505.

Predictions stored in predictor 505 consist of the predicate register number which is predicted and the value which is predicted for that predicate register. The predictor 505 can be implemented to predict several prediction registers in a single prediction. If any predictions are returned from the predictor 505, then the predictions are updated in the predicted predicate register file 510 (step 615).

The prediction for the predicate of the instruction is retrieved (step 620), by accessing the predicted predicate register file 510 with the predicate field of the instruction returned by the instruction cache 310. A record describing the fetched instruction is then stored in the instruction buffer 325 (step 625). The record contains the instruction address, the instruction, the predicate register number, and the predicted predicate value for that predicate register.

The instruction is issued from the instruction buffer 325 by the dispatch unit 330 (step 630). It is then determined whether or not the predicate for the instruction is predicted to be TRUE (step 635). If not, then the instruction is bypassed directly to the retirement queue 355 (step 640), and the method proceeds to step 660. However, if the predicate for the instruction is predicted to be TRUE, then the instruction is passed to one or more execution units (340, 345, 350) which will execute the instruction (step 645). The execution units can include one or more pipeline stages. The execution units receive their input from the future register file 335 to resolve operand references.

When the instruction completes execution in the execution units (340, 345, 350), the instructions results are updated in the future register file 335 (step 650), and added to the retirement queue 355 for in-order commitment to the architected state (step 655). Additional information about error and exception status are added to the retirement queue 355 to raise exceptions in order for speculatively executed exceptions.

It is then determined whether or not the prediction of the predicate for the instruction was correct and further, whether the instruction was executed without exception (step 660). Step 660 is performed by comparing the predicate register which was predicted to the current in-order architected state by prediction verification logic 520.

If the prediction was correct and the instruction was executed without causing an exception, then the instruction is retired in-order to the architected register file 360 and architected predicate register file 410 (step 665)

However, if the prediction was incorrect or the instruction raised an exception (or encountered some other error), then control logic 515 processes this instruction further (step 670). For example, in the case of predicate mispredictions, the predictor 505 is updated with the correct prediction for the predicate register, the in-order state at the point of misprediction is restored, and the program counter 365 is updated. The predictor 505 uses the information to update its prediction mechanism, which can be based on any of the existing prediction schemes. Execution resumes at the point of misprediction. Exceptions are handled in a similar manner, by restoring the in-order state at the point of exception and starting the exception handler.

In an alternative embodiment of the present invention, the predicted predicate value is transferred from the predictor directly to the queue entry containing the fetched instruction. This embodiment reduces the amount of steps (and delay) to obtain a prediction for any particular instruction by eliminating access to the predicted predicate register file 510. That is, an implementation may actually omit the predicted predicate register file, but at the price of requiring more entries in the prediction tables. In the previously described embodiment, the predicted predicate register file 510 allowed sharing of the predicted predicate values among multiple instructions which access the same predicate while only requiring a single entry in the predictor 505.

Figure 7:
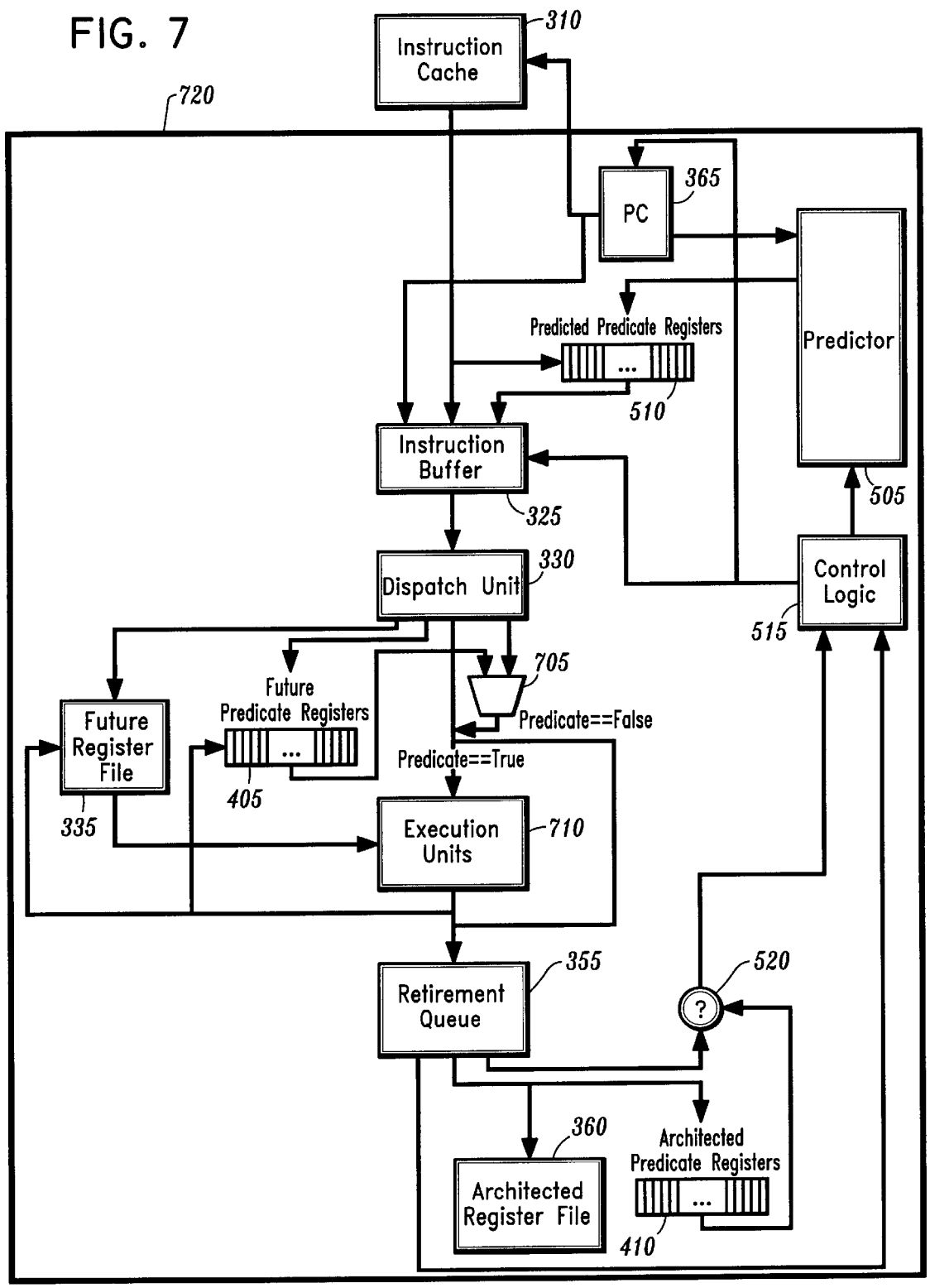
FIG. 7 is a diagram illustrating a system using execution suppression for performing out-of-order superscalar execution and predicate prediction for unresolved predicates according to an embodiment of the present invention.

FIG. 7 is a diagram illustrating a system 700 using execution suppression for performing out-of-order superscalar execution with predicate prediction for unresolved predicates according to an embodiment of the present invention. FIG. 7 has been simplified to show only the relevant portions of the data path.

The system 700 includes: the instruction cache 310; and a processor unit 720. The processor unit 720 includes: the instruction buffer 325; the dispatch unit 330; the future register file 335; the retirement queue 355; the architected register file 360; the program counter (PC) 365; the architected predicate register file 410; the predictor 505; the predicted predicate register file 510; control logic 515; prediction verification logic 520; an instruction execution unit 710 collectively including the branch unit (BU) 340, the several functional units (FUs) 345, and the several memory units (MUs) 350; and means to bypass 705.

The means to bypass 705 bypasses predicate values from the future predicate register file 405. This bypass provides the capability of overriding predictions for those values where the exact result has already been computed. This leads to an increase in prediction accuracy, since fewer predictions have to be stored, leading to a higher efficiency of predictor 505 with the same table sizes.

The predicate value is then tested as in the previously described embodiment and processing continues as previously described. No differentiation is made in the processing with respect to whether a predicate was predicted or actually available, but those instructions where a valid predicate was known before execution must necessarily match the architected predicate register state when the instructions are retired in-order. Thus, such operations cannot incur a misprediction penalty as would otherwise be the case.

This optimization is preferably combined with register renaming for predicate registers. The actual register renaming scheme employed is not critical to the invention and, thus, any register renaming scheme may be used.

According to an embodiment of the present invention, a superscalar processor that supports the prediction of instruction execution predicates and is implemented based on writeback suppression after instruction execution is augmented with the following:

1. A first mechanism i for predicting a predicate.
2. A second mechanism ii for accessing the predicate prediction.
3. A third mechanism iii for selecting the actual value of the execution predicate or, if such predicate has not yet been computed, to select the predicted value of such execution predicate.
4. A fourth mechanism iv for checking the correctness of the prediction.
5. A fifth mechanism v for updating an incorrect prediction in the prediction table and restarting execution at the mispredicted instruction point.

The described mechanisms can be associated with different operations or phases in the processing of an operation while still maintaining the spirit and scope of the present invention. For example, the first mechanism i (for predicting the predicate) can be used when the instruction which computes a predicate is fetched, or by an instruction which uses this predicate. When the first mechanism i is triggered by an instruction which uses the predicate, such mechanism can be triggered while such instruction is being fetched (i.e., by the instruction address of such instruction), or when such instruction has been decoded, or when such instruction is ready to be issued to a functional unit 345.

For illustrative purposes, it is presumed that the first mechanism i is associated with the fetching of an instruction which may use such prediction (i.e., by its instruction address during the fetch), and that predictions are stored by the predicted predicate register file 510 for future use by either this or other predicate-using operations. However, the first mechanism i may be associated with other stages of instruction processing, such as, for example, instruction decode or instruction issue. Further predictions may be stored in prediction tables or other means so that the predicted predicate register file can be omitted. One skilled in the mark may readily modify the various embodiments of the present invention disclosed herein, while still maintaining the spirit and scope of the present invention.

The second mechanism ii is accessed after the instruction fetch when the predicate register number becomes available. The predicted predicate register file 510 is then accessed in-order to determine the value of the predicted predicate register file 510.

After the instruction has executed, the third mechanism iii selects the actual execution predicate if it is available, or its predicted value if the actually computed value is not available, and suppresses the update of the future register file 335 and future predicate register file 405.

The fourth mechanism iv is implemented in the retirement stage of the processor, and executed for predicated instructions when they are retired in-order. The fourth mechanism iv checks for correctness of the predicate prediction by comparing the prediction against the in-order state of the architected predicate register file 410. When the prediction is incorrect, the predictor 505 is updated during the retirement phase, a predicate misprediction repair is performed, and the execution of the instruction is restarted with a correct prediction.

Figure 8:
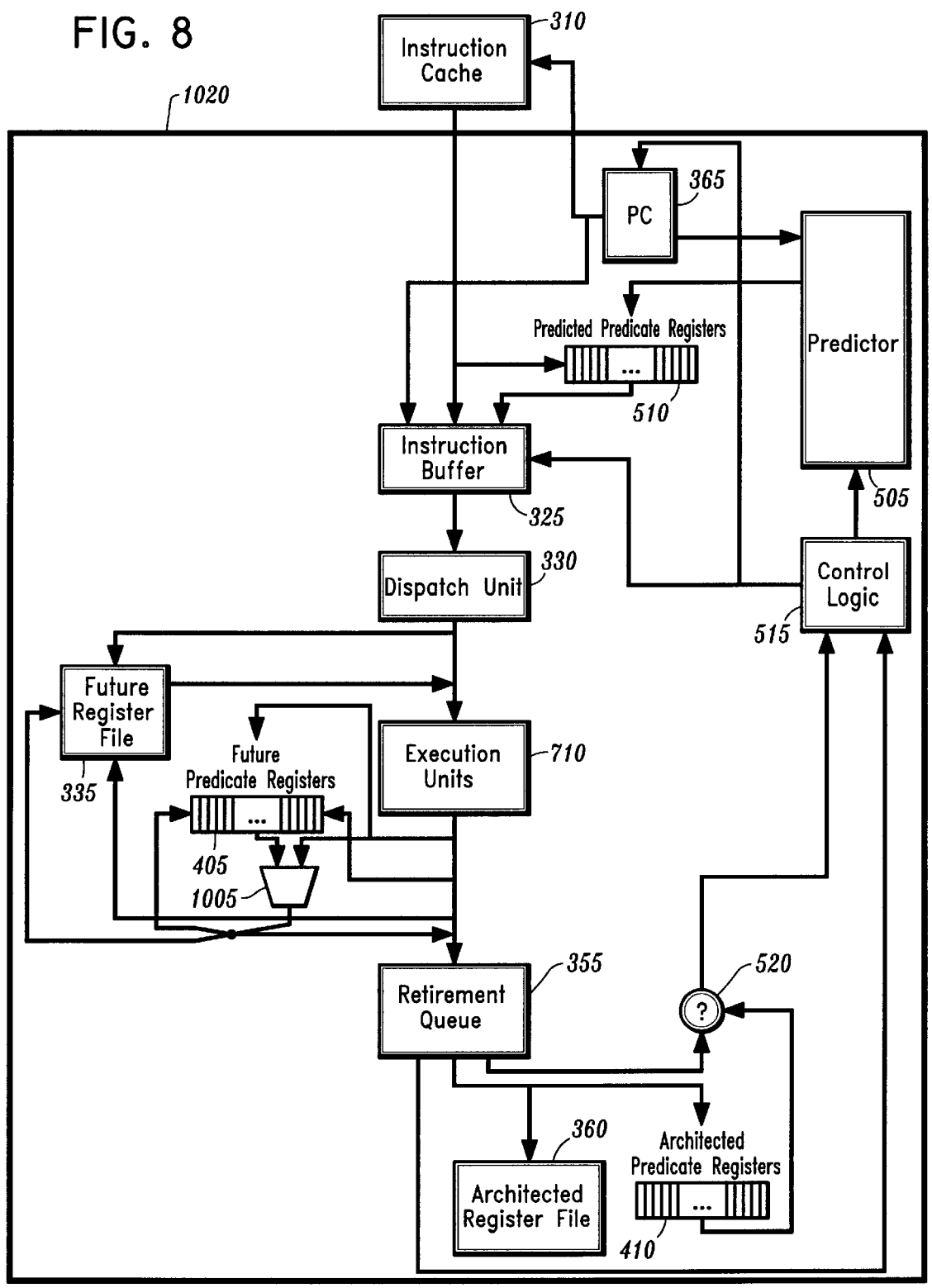
FIG. 8 is a diagram illustrating a system using writeback suppression for performing out-of-order superscalar execution and predicate prediction for unresolved predicates according to an embodiment of the present invention.

FIG. 8 is a diagram illustrating a system using writeback suppression for performing out-of-order superscalar execution and predicate prediction for unresolved predicates according to an embodiment of the present invention. FIG. 8 has been simplified to show only relevant portions of the data path.

The system 1000 includes: the instruction cache 310; and a processor unit 1020. The processor unit 1020 includes: the instruction buffer 325; the dispatch unit 330; the future register file 335; the retirement queue 355; the architected register file 360; the program counter (PC) 365; the architected predicate register file 410; the predictor 505; the predicted predicate register file 510; control logic 515; prediction verification logic 520; the instruction execution unit 710 (collectively including the branch unit (BU) 340; the several functional units (FUs) 345; and the several memory units (MUs) 350); and a predicate bypass 1005.

The instruction memory subsystem 305 (which can optionally contain a caching hierarchy) is accessed with the address of program counter 365 and returns the corresponding instruction word from the cache (or from the main memory, if a cache miss has occurred or no cache is present in a particular system).

Simultaneously, the value stored in program counter 365 is used to query the predictor 505 whether any predictions are associated with that instruction address. Predictions consist of the predicate register number which is predicted and the value which is predicted for that predicate register. The predictor can be implemented to predict several prediction registers in a single prediction. If any predictions are returned from the predictor, the predictions are updated in the predicted predicate register file 510.

The predicate field of the instruction word returned by the instruction cache (not shown) is used to access the predicted predicate register file 510, and a prediction for that predicate is retrieved. A record describing the fetched instruction word is then stored in the instruction buffer 325. The record includes the instruction address, the instruction word, the predicate register, and the predicted value for that predicate register.

Instructions are issued from the instruction buffer 325 by the dispatch unit 330. The instruction is executed by the instruction execution units 710. The instruction execution units 710 can consist of one or multiple pipeline stages, and can have one or more functional units 345. The execution units 710 communicate with the future register file 335 and future predicate register file 405 to resolve operand references. When the instruction completes execution in the execution units 710, the execution predicate is looked up from the future predicate register file 405. If the value has already been computed, it can be bypassed by the predicate bypass 1005 to override the prediction.

The result is an execution predicate which may either be predicted or the exact result. If this execution predicate evaluated to TRUE, the result of the operation is committed to the future register file 335 and/or the future predicate register file 405. In both cases (when the execution predicate is either TRUE or FALSE), the result of execution in the execution units 710 is added to retirement queue 355.

When an instruction is retired in program order, the predicate register which was predicted is compared against the current in-order architected state by prediction verification logic 520. Note that if the correct predicate value was bypassed by means of predicate bypass 1005, this verification is necessarily correct per definition. If the prediction was correct and the instruction did not raise an exception, then the instruction is retired in-order to the architected register file 360 and architected predicate register file 410.

If the prediction was incorrect, or an instruction raised an exception (or encountered some other error), then control logic 515 processes this instruction further. Predicate mispredictions are handled by updating predictor 505 with the correct prediction for predicate register. The predictor 505 uses the information to update its prediction mechanism, which can be based on any of the existing prediction schemes. Furthermore, if a predicate was mispredicted, then the in-order state at the point of misprediction is restored and the program counter 365 is updated. Execution resumes at the point of misprediction. Exceptions are handled in a similar manner, by restoring the in-order state at the point of exception, and by starting the exception handler.

Figure 9:
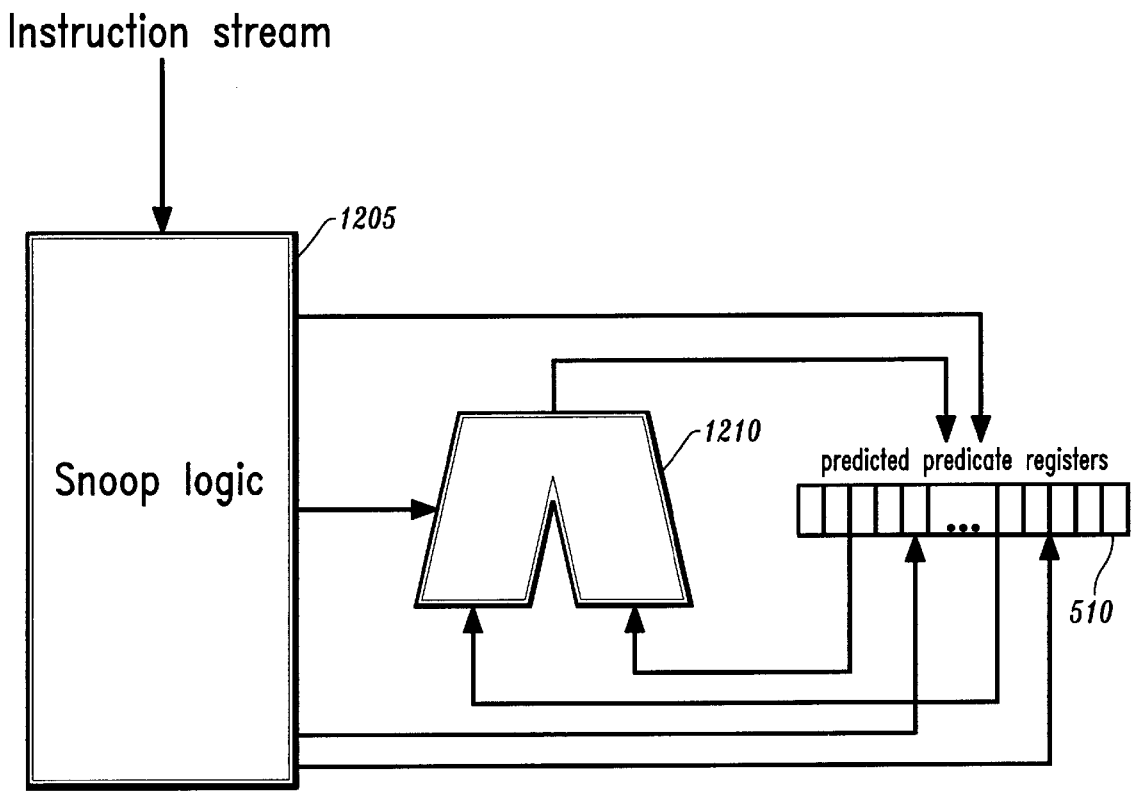
FIG. 9 is a diagram illustrating a system for improving predicate prediction accuracy according to an embodiment of the present invention.

FIG. 9 is a diagram illustrating a system 1200 for improving predicate prediction accuracy according to an embodiment of the present invention. The system 1200 improves prediction accuracy by snooping on the instruction stream and performing simple predicate operations on the predicted predicate register file 510. The system 1200 includes: instruction snoop logic 1205; and predicate prediction enhancement logic 1210 for executing a subset of predicate-manipulating operations.

The snoop logic 1205 "snoops" on the instruction stream to determine whether or not a predicate computing instruction has been fetched, but leaves the instruction stream unmodified. The snoop logic 1205 tests whether an instruction fetched from the instruction memory subsystem 305 is part of a (implementation-dependent) subset of predicate computing operations which are implemented by predicate prediction enhancement logic 1210.

This subset may consist of, for example, all predicate-manipulating operations, a subset thereof, or a single instruction such as predicate move operations. Predicate manipulating operations are supported in several architectures such as, for example, the IBM PowerPC™ architecture.

When the snoop logic 1205 detects such operation, it extracts a copy from the instruction stream (but does not remove the instruction from the instruction stream) and directs prediction enhancement logic 1210 to execute the operation on the predicted register file (this execution will preferably be performed in-order).

Consider the case were the subset of executed predicate operations consists of simply a single instruction (the move predicate register operation) and the following instruction sequence is to be executed:

| | |
|---|---|
| 1 cmp cr1, r4, r5 | ; set the predicates of condition register cr1 |
| 2 addi r3, r3, 1 if cr1.eq | ; add constant 1 to r3 if the predicate cr1.eq is true |
| 3 move cr5, cr1 | ; move cr1 to cr5 |
| 4 addi r4, r4, 1 if cr5.eq | ; add constant 1 to r4 if the predicate cr5.eq is true |

The above exemplary instruction sequence (instructions 1 through 4) is based on the IBM PowerPC™ architecture with additional predication capability indicated by an if-clause which can optionally follow an instruction and indicates which predicate must evaluate to TRUE for the instruction to execute.

When predicate prediction enhancement logic 1210 is used to implement the move condition register (a condition register is a collection of 4 predicates on the IBM PowerPC™ architecture) in conjunction with predicate prediction, no additional prediction is required for predicate cr5.eq before the fourth instruction can execute. This reduces the number of predictions which are required in a program and increases overall prediction effectiveness for a given table size used by a predictor. In addition, only instruction 2 would incur misprediction penalties, since instruction 4 is guaranteed to always use the prediction made for instruction 2. Thus, if predicate prediction for instruction 2 was correct, then the predicate prediction for instruction 4 will also be correct. However, if predicate prediction for instruction 2 was incorrect, then no additional misprediction penalty is incurred by instruction 4, since control logic 515 will direct the predictor to update the prediction for instruction 2 and restart execution at instruction 2.

Using predicate prediction as described above results in execution along exactly one branch of the "if" statement, since execution is reduced to one "most likely" sequence of instructions. An alternative embodiment allows the aggressive concurrent execution of multiple paths following the predication execution paradigm, but in conjunction with out-of-order execution and register renaming.

In the following embodiments of the present invention, the execution of instructions having execution predicates is performed in conjunction with a data dependence prediction mechanism. The data dependence prediction mechanism predicts which result register of one instruction is referenced by which input register of another instruction.

Consider again the previous code fragment which, for the purpose of this example, has been extended by one additional statement:

```
1    if (a < 0)
2       a--;
3    else
4       a++;
5    p = a + 10;
```

The unpredicated instruction sequence for the IBM PowerPC™ is as follows (the code corresponding to the statement in source code line 5 is at label L2):

```
      cmpwi   cr0, r3, 0          ; compare a < 0
      bc      false, cr0.1t, L1   ; branch if a >= 0
      addic   r3, r3, -1          ; a--
      b       L2                  ; skip else path
L1:   addic   r3, r3, 1           ; a++
L2:   addic   r20, r3, 10         ; p = a + 10
```

Similarly, an instruction sequence of this code using an IBM PowerPC™ architecture, modified to support predication, is as follows:

```
I1    cmpwi   cr0, r3, 0            ; compare a < 0
I2    addic   r3, r3, -1 if cr0.1t  ; a-- if a < 0
I3    addic   r3, r3, 1 if !cr0.1t  ; a++ if a >= 0
I4    addic   r20, r3, 10           ; p = a + 10
...
```

Consider now the out-of-order execution with register renaming of this example code sequence. The instructions are fetched in program order, and then decoded in program order. When they reach the dispatch unit 330, destination register specifiers of each of the instructions are renamed to registers in the future register file 335 and future predicate register file 405, as appropriate.

Assume that destination cr0 of I1 is renamed to PR65 (in the future predicate register file 405), destination r3 of I2 is renamed to R66, destination of r3 of I3 is renamed to R67, and destination r20 of I4 is renamed to R68 (each in the future register file 335). The dispatch unit 330 also queries the architected register file 360 and the architected predicate register file 410 for the values of source register operands of these instructions, in program order. Thus, first the value of r3, which is a source operand in I1, is queried and acquired from the architected register file 360. Then, the value of r3, which is a source operand in I2, is queried and acquired from the architected register file 360. Next, the value of r3, which is a source of I3, is queried and is assigned the value of r3 from the future register file as assigned to the destination register for instruction I2. Then, the value of r3, which is a source register in I4, is queried from the architected register file 360. At this time, the dispatch unit 330 detects that the value of r3 generated by I3 should be used by I4 (again, a case of pure dependence). Thus, it is declared that the value to be used by I4 is unavailable, and the future register name, R67 in this case, is copied along with I4 as an indication of where to acquire the value from once the value is generated.

As a result of the described scheduling and renaming actions, the following schedule has been generated:

```
1   cmpwi   PR65, r3, 0
2   addic   R66, r3, -1 if PR65.1t
3   addic   R67, R66, 1 if !PR65.1t
4   addic   R68, R67, 10
```

This is clearly erroneous, since the input dependence of the add instruction 3 should be satisfied by the previous, architected value of r3. Similarly, if r3<0, then the input dependence into instruction 4 should be resolved to R66, with a rename name for register r3 computed by instruction 2.

The following embodiment of a processor according to the invention presents a technique to correct this situation by predicting data dependencies and guiding register renaming. The processor includes the following components:

A. A first mechanism I which maintains a list of future register names associated with each renamed architected register (for example, the list consists of [R67, R68] for r3).

B. A second mechanism II which renames the architected destination register for a predicated instruction and adds the future register name to the list of future register names for that architected register (for example, the list for r3 will be empty at the beginning; it will consist of [R67] when r3 in I2 is renamed; and of [R67, R68] when r3 in I2 is renamed).

C. A third mechanism III to predict exactly one of the future register names to be used as a source register name (for example, R67 or R68 from the list for r3).

D. A fourth mechanism IV which associates this prediction with the instruction for which the prediction had to be made (for example, if R67 was the predicted name, then instruction I4 carries with it that information); the information is carried for each of the source operands of each such instruction.

E. A fifth mechanism V which detects when an instruction is ready to be retired, and whether the future register name associated with the instruction is correct. If the future register name is incorrect, then the mechanism squashes the contents of the retirement queue 355 in a fashion similar to the correction of branch mispredictions, as is evident to those skilled in the art.

F. A sixth mechanism VI which corrects the state of the predictor introduced in the third mechanism above, upon detection of a misprediction.

Figure 10:
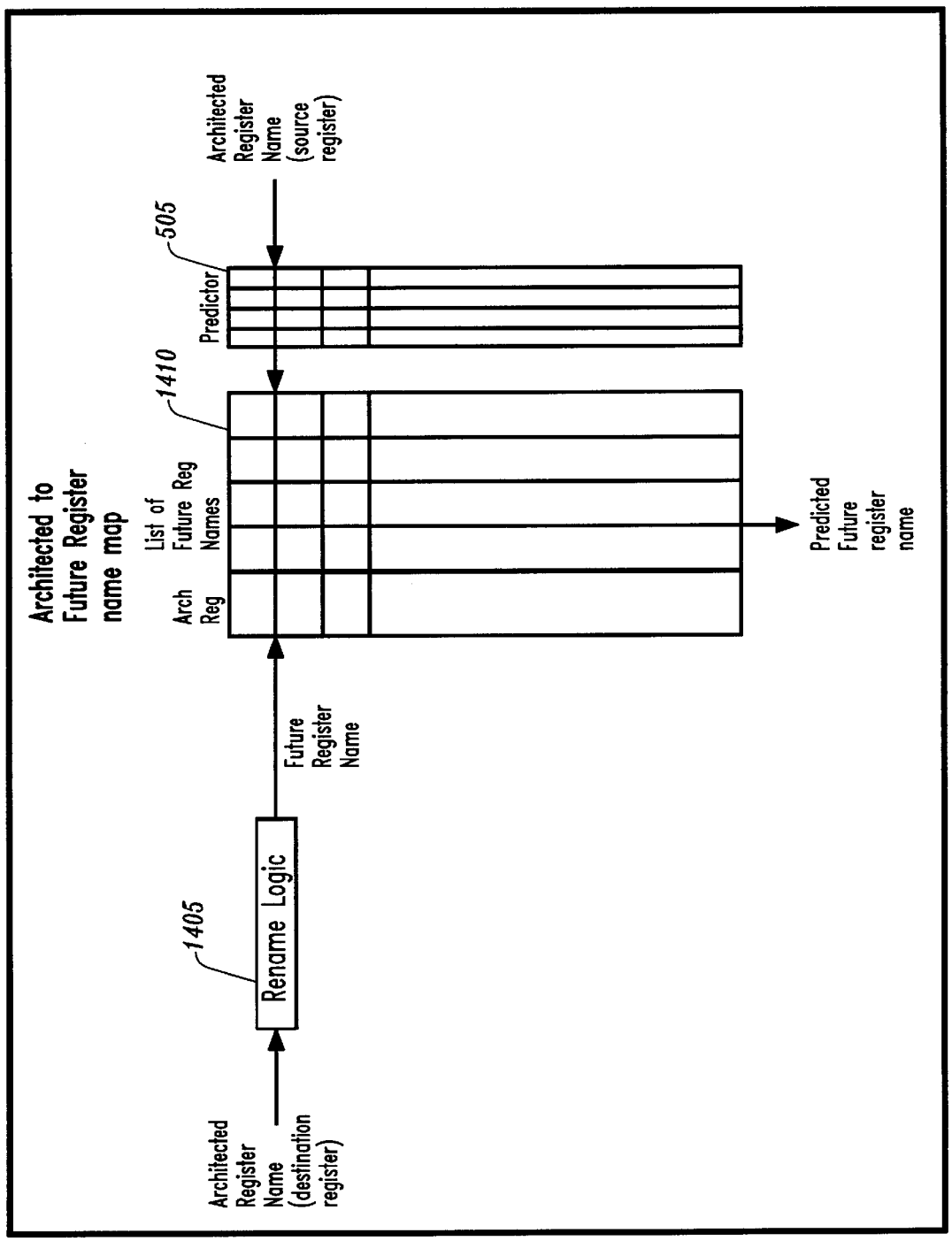
FIG. 10 is a diagram illustrating an apparatus for predicting data dependence in a computing processing system according to an embodiment of the present invention.

The first I, second II, and third III mechanisms are shown in FIG. 10 which includes the hardware to be incorporated into the dispatch unit 330 shown in FIG. 4.

FIG. 10 is a diagram illustrating an apparatus 1400 for predicting data dependence in a computing processing system according to an embodiment of the present invention. The apparatus 1400 includes: rename logic 1405; an architected to future register name map 1410; and the predictor 505.

In FIG. 10, rename logic 1405 includes the second mechanism II, whereas an architected to future register name map 1410 includes the first mechanism I. The second mechanism II is shown as the predictor 505. When the architected destination register of an instruction is to be renamed, the architected name is presented to the rename logic 1405. The rename logic 1405 has internal state which it consults to produce a new future register name to be assigned to the architected destination register. This pair (architected destination register name, future register name) is used to update an entry in the list for the architected destination register name in the future register name map 1410. For illustrative purposes, a maximum number of 4 entries was chosen for each of the lists shown in FIG. 10. However, it is to be appreciated that other embodiments according to the present invention may include a single entry in a list, or a multiple number of entries other than 4.

When an architected source register is presented to the rename logic 1405 to acquire its future register name, the architected source register name is presented to the predictor 505. The predictor 505 indexes to the entry for the name in the name map, and uses a prediction scheme to predict one of the multiple future register names (or the architected name) from the architected to future register name map 1410. This prediction is copied with the instruction into the retirement queue 355.

It is assumed that the necessary extra information needed to implement the fourth mechanism IV is incorporated in the retirement queue 355, and is thus not separately shown.

Figure 11:
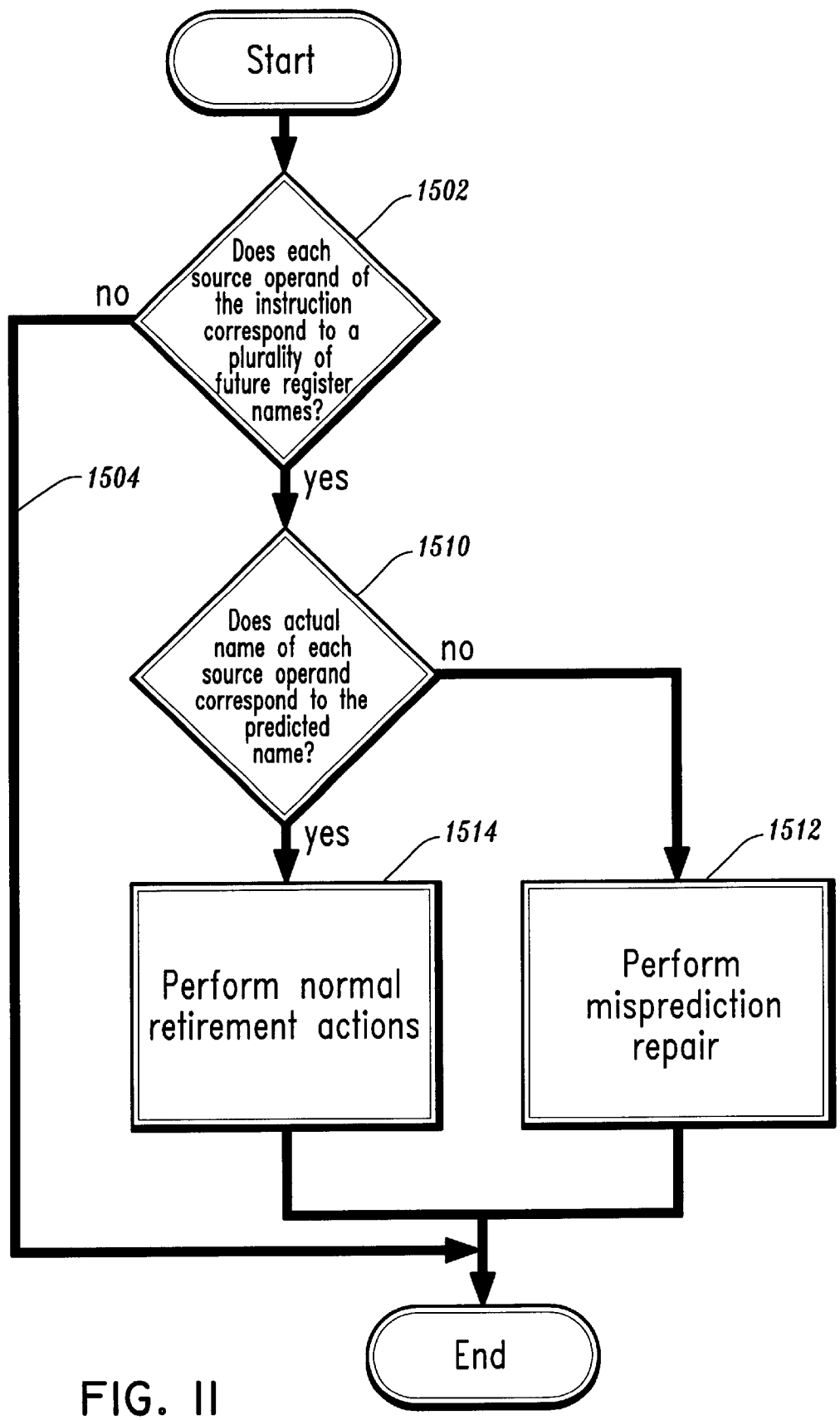
FIG. 11 which is a flow chart illustrating a method for verifying predictions of future register names from architected source register names for an instruction to be retired according to an embodiment of the present invention.

The fifth V and the sixth VI mechanisms are shown in FIG. 11, which is a flow chart illustrating a method for verifying predictions of future register names from architected source register names for an instruction to be retired according to an embodiment of the present invention.

When an instruction is due to be retired, it is determined whether each given source operand in the instruction corresponds to a plurality of future register names in the architected to future register name map 1410 (in particular, the list of future register names 1410b of the name map 1410) (step 1502). If not, then the method is terminated (step 1504). Else, the method proceeds to step 1506.

It is determined whether the actual name for each source operand (held as the actual outcome in the predictor itself) corresponds to the predicted name (held along with the instruction in the retirement queue 355) (step 1510).

If the actual name does not correspond to the predicted name (i.e., if there is no match) for each source operand, then a misprediction repair is initiated for the instruction (step 1512). The misprediction repair may include the retirement queue 355 marking all the operations in the retirement queue 355 as invalid, flushing the retirement queue 355, and resetting the machine to fetch instructions again from the one on which the misprediction was detected. On the other hand, if the actual name corresponds to the predicted name (i.e., if there is a match) for each source operand, then the prediction is deemed to be correct and the method proceeds to step 1514.

At step 1514, normal retirement actions are taken. For example, if it is a predicated instruction and the value of the controlling predicate is TRUE, then the content of its future destinations register are copied to the architected register file as indicated above. When a predicated operation is not retired because the value of the predicate turns out to be FALSE, the name of the future register assigned to its destination register is deallocated. The name thus becomes available for use again.

The preferred embodiment of the present invention shown in FIG. 10 performs concurrent processing/checking of the source operands for mispredictions. However, other embodiments of the present invention may employ sequential processing/checking of the source operands for mispredictions. One skilled in the art will contemplate these and various other embodiments, while still maintaining the spirit and scope of the present invention.

One embodiment of the name predictor is positional. Each position in the name list for an architected register has state associated with it. When a new name is entered in the list, the position held by the name is made valid. One of the many entries on the list is selected as the outcome of the prediction using a variety of techniques which are similar in spirit to the hysteresis-based, one-or two-level adaptive branch predictors (or combinations thereof).

To correct a misprediction, the correct name for a given architected name is received from the retirement queue 355. The "hysteresis" of the position for the name is reduced. When the level of hysteresis in the name is at the lowest level, the bias of the predictor is shifted to the actual outcome. The state machine associated with the predictor 505 will be recognizable to anyone well-cognizant in the art, and can be implemented in a variety of ways.

In an optimized embodiment the position of the name in the predictor, rather than the name itself, is associated with an operation at the time of prediction. This optimization greatly improves the performance of misprediction repair.

Another optimized embodiment uses solely the position indicators throughout the mechanism. This ensures that even if different future register names were used at different times in the execution of the same piece of code (for example, in a loop, or when a function is called multiple times from different places in the program), the position assignment remains in the same order, without hindering the predictability of the rename name at each of the different places in the execution.

Yet another embodiment of the predictor may associate the predictor state with the actual predicted names, rather than only the position of the predicted name in the list. This method would use the name in the predictor lookup and correction logic (i.e., architected to future register name map 1410). Another possibility is to associate the instruction addresses with the predictor state and use them for accessing/updating the predictor. Based on the teachings herein, these and various other embodiments may be readily determined by one skilled in the art, while maintaining the spirit and scope of the present invention.

In an alternative embodiment, when an instruction depends on the result of another, predicated instruction whose predicate condition has not yet been resolved, predicate prediction is not used. Referring to FIG. 9, if a source register contains more than a single name, the instruction referring to such source register is entered in the instruction stream multiply. The entered instruction contains one combination of source registers, and the instruction will be predicated on a condition constructed such that it is TRUE if and only if the input registers used by this instantiation of the instruction will correspond to the state of the processor when control reaches the present instruction in-order.

In the alternative embodiment, data dependence prediction provides multiple rename register names for a source register. Multiple copies of such instructions are issued, each referring to a different rename register. Referring to FIG. 10, an architected register may have several rename registers associated with it. When an instruction such as, for example, the IBM PowerPC™ instruction I4 from the previous example contains a source operand which has multiple rename candidates (in this case, the candidates are rename registers R66 and R67, as well as the architected value of r3), the data dependence prediction produces multiple predictions. In the previous code example, these predictions may reference the rename registers R66 and R67. The dispatch unit then issues the instruction (I4 in this example) multiple times, once for each appropriate combination of input operands (not all combinations need to be issued), predicates on a condition describing the case in which the selected combination of rename registers would correspond to the architected state at the instruction being issued. In the case of instruction I4, r3 would have the value of R66 exactly if PR65.lt is TRUE, and the value of R67 if the value of PR65.lt is FALSE.

As a result of the described scheduling and renaming actions, the example would be issued as the following sequence of instructions:

| | | |
|---|---|---|
| cmpwi | PR65, r3, 0 | |
| addic | R66, r3, −1 if PR65.lt | ; retire r66 to r3 |
| addic | R67, r3, 1 if !PR65.lt | ; retire r67 to r3 |
| addic | R68, R66, 10 if PR65.lt | ; retire r68 to r3 |
| addic | R69, R67, 10 if !PR65.lt | ; retire r69 to r3 |

This corresponds to the formation of hyperblock structures during the instruction execution, so that code portions can be duplicated and speculatively executed along multiple possible paths before all the execution predicates have become available.

In an optimized embodiment, the code duplication and reissue (i.e., the hardware-based hyperblock formation) is only performed if a source register is sufficiently hard to predict. Thus, if sufficient prediction accuracy can be obtained, data dependence prediction is used. For some source registers, multiple register names are supplied and code duplication is performed. The supplied number of rename registers may either be the entire rename list, or a subset thereof corresponding to the most likely source registers.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for executing an ordered sequence of instructions in a computer processing system, the sequence of instructions stored in a memory of the system, wherein at least one of the instructions comprises a predicated instruction that represents at least one operation that is to be conditionally performed based upon an associated flag value, the method comprising the steps of:

fetching a group of instructions from the memory;

scheduling execution of instructions within the group, wherein the predicated instruction is moved from its original position in the ordered sequence of instructions to an out-of-order position in the sequence of instructions; and executing the instructions in response to said scheduling.

2. The method according to claim 1, further comprising the step of writing results of said executing step to one of architected registers and the memory in an order corresponding to the ordered sequence of instructions.

3. The method according to claim 1, further comprising the step of generating a predicted value for the associated flag value, when the associated flag value is not available at execution of the predicated instruction.

4. The method according to claim 3, further comprising the step of modifying execution of the operations represented by the predicated instruction based upon the predicted value.

5. The method according to claim 4, wherein said modifying step comprises the step of selectively suppressing write back of results generated by the operations represented by the predicated instruction based upon the predicted value.

6. The method according to claim 4, wherein said modifying step comprises the step of selectively issuing operations represented by the predicated instruction based upon the predicted value.

7. The method according to claim 3, further comprising the steps of:

determining whether the predicted value for the associated flag value is correct, upon one of execution and retirement of the predicated instruction;

executing the predicate instruction using a correct prediction, when the predicted value for the associated flag value is not correct; and writing results corresponding to the execution of the predicated instruction to one of architected registers and the memory, when the predicted value for the associated flag value is correct.

8. A method for executing instructions in a computer processing system, the instructions being stored in a memory of the system, wherein at least one of the instructions comprises a predicated instruction that represents at least one operation that is to be conditionally performed based upon at least one associated flag value, the method comprising the steps of:

fetching a group of the instructions from the memory;

in the event that the group includes a particular predicated instruction whose associated flag value is not available, generating data representing a predicted value for the associated flag value; and modifying execution of operations represented by the particular predicated instruction based upon the predicted value.

9. The method according to claim 8, wherein said modifying step comprises the step of selectively issuing operations represented by the particular predicated instruction based upon the predicted value.

10. The method according to claim 8, wherein said modifying step comprises the step of selectively suppressing write back of results generated by operations represented by the particular predicated instruction based upon the predicted value.

11. The method according to claim 8, further comprising the step of scheduling the instructions such that at least one instruction is moved from a current position in a sequence of instructions to an earlier position.

12. The method according to claim 11, wherein said scheduling is performed at execution time.

13. The method according to claim 11, further comprising the step of executing the instructions in accordance with said scheduling.

14. The method according to claim 11, wherein the at least one instruction moved to the earlier position is the particular predicated instruction.

15. The method according to claim 8, further comprising the steps of:
determining whether the predicted value for the associated flag value is correct, upon one of execution and retirement of the particular predicated instruction;
executing the particular predicated instruction using a correct prediction, when the predicted value for the associated flag value is not correct; and
writing results corresponding to the execution of the particular predicated instruction to one of architected registers and the memory, when the predicted value for the associated flag value is correct.

16. The method according to claim 15, further comprising the step of canceling effects of instructions dependent upon the particular predicated instruction, when the predicted value for the associated flag value is not correct.

17. The method according to claim 15, wherein said step of determining whether the predicted value for the associated flag value is correct comprises the step of comparing the predicted value against an in-order state of architected registers.

18. The method according to claim 8, further comprising the step of modifying execution of instructions dependent upon the particular predicated instruction based on the predicted value.

19. The method according to claim 8, further comprising the step of generating and storing predictions corresponding to a plurality of predicates in a table.

20. The method according to claim 19, wherein the table comprises a plurality of entries, each entry comprising at least one predicted predicate register number respectively corresponding to at least one predicate register and at least one predicted flag value respectively corresponding to the at least one predicated register.

21. The method according to claim 8, wherein the associated flag value is one of true and false, and the method further comprises the steps of:
storing predictions corresponding to a plurality of predicates in a table;
accessing the stored predictions upon execution of instructions comprising at least one of the plurality of predicates; and
executing instructions whose predicates are predicted to be true.

22. The method according to claim 8, further comprising the step of overriding the predicted value, when an actual result has already been computed for the predicted value.

23. The method according to claim 8, further comprising the step of determining whether a branch instruction is predicted to be one of taken and not taken, based upon the predicted value associated with the particular predicated instruction.

24. The method according to claim 8, further comprising the steps of:
storing at least one prediction corresponding to at least one predicate in a table; and
storing an address to which a branch instruction may branch to in the table, when the at least one prediction corresponds to the branch instruction.

25. A method for executing instructions in a computer processing system, the instructions being stored in a memory of the system, the method comprising the steps of:
fetching a group of the instructions from the memory, wherein the group comprises at least one predicated instruction that represents at least one operation that is to be conditionally performed based upon at least one associated flag value;
executing the group of instructions including the predicated instruction, even if the associated flag value of the predicated instruction is unavailable;
storing a list of one of register names and values for results of unresolved predicates;
identifying instructions that use registers for which one of multiple names and multiple values are available;
for a given identified instruction, selecting only one of either the multiple names or the multiple values;
upon resolution of the predicate corresponding the given identified instruction, determining whether the selection is correct; and
modifying execution of operations subsequent to the given instruction, when the selection is not correct.

26. The method according to claim 25, wherein said modifying step modifies execution of operations subsequent to and dependent upon the given instruction.

27. A method for executing instructions in a computer processing system, the instructions being stored in a memory of the system, the method comprising the steps of:
fetching a group of the instructions from the memory, wherein the group comprises at least one predicated instruction that represents at least one operation that is to be conditionally performed based upon at least one associated flag value;
executing the group of instructions including the predicated instruction, even if the associated flag value of the predicated instruction is unavailable;
storing a list of one of register names and values for results of unresolved predicates;
identifying instructions that use registers for which one of multiple names and multiple values are available;
for a given identified instruction, selecting at least two of either the multiple names or the multiple values;
generating a predicate for a condition in which one of the selected at least two multiple names or the at least two multiple values would correspond to an architected state at an in-order location of the given instruction being issued;
executing the given instruction multiple times for each possible combination of the selected at least two multiple names or at least two multiple values;
upon resolution of the predicates corresponding the given identified instruction, determining which one of the selections is correct; and modifying execution of operations subsequent to the given instruction, when none of the selections are correct.

28. A method for verifying predictions of future register names from architected source register names for an instruction to be retired, the method comprising the steps of:
- determining whether each given source operand in the instruction corresponds to a plurality of future register names;
- determining whether the actual name for each of the source operands corresponds to the predicted name for each of the source operands, when the actual name to be used for each of the given source operands is not available;
- performing a misprediction repair for the instruction, when at least one source operand name has been mispredicted; and
- retiring the instruction, when the actual name for each of the source operands corresponds to the predicted name for each of the source operands.

29. An apparatus for executing an ordered sequence of instructions in a computer processing system, the sequence of instructions stored in a memory of the system, wherein at least one of the instructions comprises a predicated instruction that represents at least one operation that is to be conditionally performed based upon an associated flag value, the method comprising the steps of:
- means for fetching a group of instructions from the memory;
- means for scheduling execution of instructions within the group, wherein the predicated instruction is moved from its original position in the ordered sequence of instructions to an out-of-order position in the sequence of instructions; and
- means for executing the instructions in response to said scheduling.

30. The apparatus according to claim 29, further comprising means for predicting the associated flag value, when the associated flag value is unavailable.

31. The apparatus according to claim 30, further comprising means for suppressing execution of the predicated instruction, when the associated flag value is predicted to be false.

32. The apparatus according to claim 30, further comprising:
- means for determining whether the predicted flag value is correct; and
- means for updating the predicted flag value and restarting execution at the instruction associated with the predicted flag value, when the predicted flag value is not correct.

33. The apparatus according to claim 32, further comprising means for updating an in-order state of the system, when the predicted flag value is correct.

34. The apparatus according to claim 29, wherein said means for executing executes the predicated instruction even if the associated flag value of the predicated instruction is unavailable.

35. The apparatus according to claim 34, further comprising:
- means for storing a list of one of register names and values for results of unresolved predicates;
- means for identifying predicated instructions that use registers for which one of multiple names and multiple values are available;
- means for selecting only one of either the multiple names or the multiple values, for a given identified instruction;
- means for determining whether the selection is correct, upon resolution of the predicate corresponding the given identified instruction; and
- means for modifying execution of operations subsequent to the given instruction, when the selection is not correct.

* * * * *